(12) United States Patent
Ishibashi

(10) Patent No.: US 7,649,699 B2
(45) Date of Patent: Jan. 19, 2010

(54) CEMENTED LENS AND OPTICAL SYSTEM HAVING THE SAME

(75) Inventor: Tomohiko Ishibashi, Utsunomiya (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 12/335,754

(22) Filed: Dec. 16, 2008

(65) Prior Publication Data
US 2009/0185282 A1 Jul. 23, 2009

(30) Foreign Application Priority Data
Jan. 18, 2008 (JP) .............................. 2008-009081

(51) Int. Cl.
G02B 9/00 (2006.01)
G02B 9/04 (2006.01)
G02B 9/12 (2006.01)
G02B 13/04 (2006.01)
G02B 15/14 (2006.01)

(52) U.S. Cl. .................. 359/797; 359/687; 359/753; 359/784; 359/793

(58) Field of Classification Search .................. 359/680, 359/682, 687, 689, 690, 691, 748, 753, 754–758, 359/763, 764, 771, 772, 784, 785, 786, 788, 359/793, 796, 797
See application file for complete search history.

(56) References Cited

U.S. PATENT DOCUMENTS 3,536,379 A * 10/1970 Knetsch ...................... 359/796
6,226,132 B1 * 5/2001 Abe .............................. 359/797
7,292,398 B1 11/2007 Misaka ........................ 359/781

FOREIGN PATENT DOCUMENTS

JP 2007-163964 6/2007

* cited by examiner

*Primary Examiner*—Darryl J Collins
(74) *Attorney, Agent, or Firm*—Fitzpatrick, Cella, Harper & Scinto

(57) ABSTRACT

A cemented lens comprises first, second and third optical elements respectively formed by different solid materials, the third and first optical elements being cemented to each other, and the first and the second optical elements being cemented to each other, wherein both an incident surface and an exit surface of the first and second optical elements are refracting surfaces, and the following conditional expressions are satisfied:

$|\Delta\theta gF1|>0.0272$ $|\Delta\theta gF2|>0.0272$ $\Delta\theta gF1 \times \Delta\theta gF2 < 0$ $\phi 1 \times \phi < 0$ where $\Delta\theta gF1$ and $\Delta\theta gF2$ are respectively anomalous dispersion characteristics of the materials for the first and the second optical elements with respect to a g line and an F line, and $\phi 1$ and $\phi 2$ are respectively refracting powers of the first and second optical elements when both the incident surface and the exit surface of the first and the second optical element are surfaces in contact with air.

12 Claims, 16 Drawing Sheets

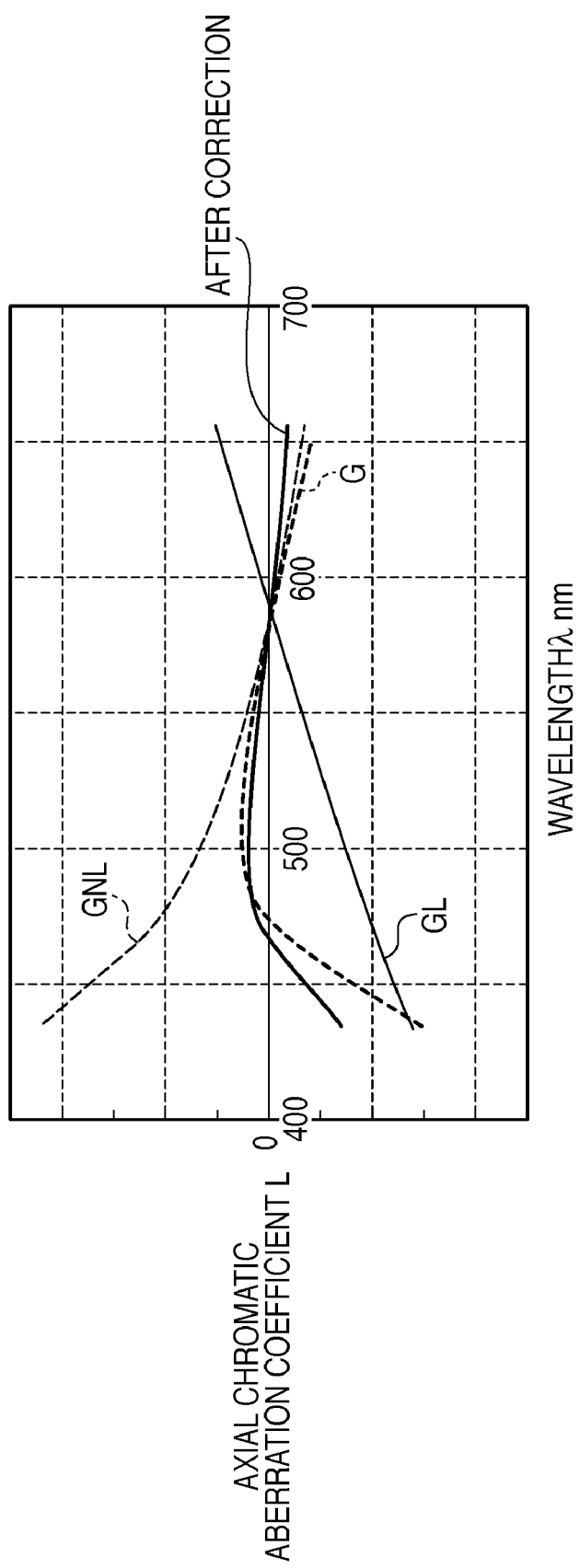

FIG. 18

|  | UV CURABLE RESIN 1 | UV CURABLE RESIN 2 | BASE SYNTHETIC RESIN 1 | ITO | TiO$_2$ |
|---|---|---|---|---|---|
| Nd | 1.6356 | 1.6296 | 1.5241 | 1.8571 | 2.3038 |
| Ng | 1.6753 | 1.6638 | 1.5371 | 1.9924 | 2.4568 |
| NC | 1.6281 | 1.6227 | 1.5212 | 1.7979 | 2.2803 |
| NF | 1.6560 | 1.6477 | 1.5313 | 1.9487 | 2.3745 |
| νd | 22.73 | 25.26 | 51.55 | 5.69 | 13.84 |
| θgd | 1.4220 | 1.3728 | 1.2695 | 0.8976 | 1.6241 |
| θgF | 0.6895 | 0.6481 | 0.5631 | 0.2901 | 0.8731 |

FIG. 19

|  | S-FSL5(OHARA) | S-LAH58(OHARA) | UV CURABLE RESIN 1 | BASE SYNTHETIC RESIN 1 | PMMA | PC |
|---|---|---|---|---|---|---|
| LINEAR EXPANSION COEFFICIENT(×10$^{-7}$/°C) | 90 | 66 | 700 | 750 | 700 | 600 |
| dn/dT(×10$^{-6}$/°C) | −0.7 | 4.9 | −160 | −140 | −140~−130 | −100~−120 |

FIG. 20A

| | | FIRST EMBODIMENT | | | | | |
|---|---|---|---|---|---|---|---|
| | | G1 | | | | G2 | |
| CONDITIONAL EXPRESSION | | FIRST OPTICAL ELEMENT G11 | SECOND OPTICAL ELEMENT G21 | FIRST OPTICAL ELEMENT G12 | SECOND OPTICAL ELEMENT G22 | FIRST OPTICAL ELEMENT G13 | SECOND OPTICAL ELEMENT G23 |
| | | UV CURABLE RESIN 1 | ITO 14.2%-BASE SYNTHETIC RESIN 1 | UV CURABLE RESIN 1 | ITO 14.2%-BASE SYNTHETIC RESIN 1 | ITO 5%-BASE SYNTHETIC RESIN 1 | TiO2 3%-BASE SYNTHETIC RESIN 1 |
| | Nd | 1.6356 | 1.5648 | 1.6356 | 1.5648 | 1.5425 | 1.5532 |
| | Ng | 1.6753 | 1.5941 | 1.6753 | 1.5941 | 1.5630 | 1.5725 |
| | NC | 1.6281 | 1.5544 | 1.6281 | 1.5544 | 1.5362 | 1.5494 |
| | NF | 1.6560 | 1.5826 | 1.6560 | 1.5826 | 1.5549 | 1.5633 |
| 5,6 | νd | 22.73 | 20.03 | 22.73 | 20.03 | 29.05 | 39.81 |
| | θgd | 1.4220 | 1.0517 | 1.4220 | 1.0517 | 1.0963 | 1.3852 |
| | θgF | 0.6895 | 0.4194 | 0.6895 | 0.4194 | 0.4346 | 0.6645 |
| 9,10 | Δθgd | 0.0826 | −0.2996 | 0.0826 | −0.2996 | −0.2178 | 0.1063 |
| 1,2 | ΔθgF | 0.0652 | −0.2147 | 0.0652 | −0.2147 | −0.1688 | 0.0898 |
| | φ | 0.00054 | −0.00029 | 0.00050 | −0.00018 | −0.00031 | 0.00031 |

FIG. 20B

| CONDITIONAL EXPRESSION | | SECOND EMBODIMENT | | THIRD EMBODIMENT | | | |
|---|---|---|---|---|---|---|---|
| | | G1,G2 | | G1 | | G2,G3 | |
| | | FIRST OPTICAL ELEMENT G11 | SECOND OPTICAL ELEMENT G21 | FIRST OPTICAL ELEMENT G11 | SECOND OPTICAL ELEMENT G21 | FIRST OPTICAL ELEMENT G12 | SECOND OPTICAL ELEMENT G22 |
| | | UV CURABLE RESIN 1 | ITO 14.2%-BASE SYNTHETIC RESIN 1 | N-POLYVINYL-CARBAZOLE | ITO 15%-N-POLYVINYL-CARBAZOLE | ITO 10%-N-POLYVINYL-CARBAZOLE | UV CURABLE RESIN 2 |
| | Nd | 1.6356 | 1.5648 | 1.6959 | 1.7211 | 1.7127 | 1.6296 |
| | Ng | 1.6753 | 1.5941 | 1.7516 | 1.7898 | 1.7772 | 1.6638 |
| | NC | 1.6281 | 1.5544 | 1.6853 | 1.7027 | 1.6969 | 1.6227 |
| | NF | 1.6560 | 1.5826 | 1.7246 | 1.7601 | 1.7483 | 1.6477 |
| 5,6 | νd | 22.73 | 20.03 | 17.68 | 12.56 | 13.85 | 25.26 |
| | θgd | 1.4220 | 1.0517 | 1.4155 | 1.1977 | 1.2527 | 1.3728 |
| | θgF | 0.6895 | 0.4194 | 0.6856 | 0.5181 | 0.5604 | 0.6481 |
| 9,10 | Δθgd | 0.0826 | −0.2996 | 0.0533 | −0.1901 | −0.1283 | 0.0439 |
| 1,2 | ΔθgF | 0.0652 | −0.2147 | 0.0424 | −0.1466 | −0.0986 | 0.0326 |
| | φ | 0.00052 | −0.00039 | 0.00015 | −0.00336 | −0.00647 | 0.00245 |

FIG. 20C

| | | FOURTH EMBODIMENT | | FIFTH EMBODIMENT | | | | SIXTH EMBODIMENT | |
|---|---|---|---|---|---|---|---|---|---|
| | | G1 | | G1 | | G2, G3 | | G1, G2 | |
| | | FIRST OPTICAL ELEMENT G11 | SECOND OPTICAL ELEMENT G21 | FIRST OPTICAL ELEMENT G11 | SECOND OPTICAL ELEMENT G21 | FIRST OPTICAL ELEMENT G12 | SECOND OPTICAL ELEMENT G22 | FIRST OPTICAL ELEMENT G11 | SECOND OPTICAL ELEMENT G21 |
| CONDITIONAL EXPRESSION | | ITO 20%-BASE SYNTHETIC RESIN 1 | TiO₂ 20%-BASE SYNTHETIC RESIN 1 | ITO 10%-N-POLYVINYL-CARBAZOLE | N-POLYVINYL-CARBAZOLE | UV CURABLE RESIN 1 | ITO 5%-BASE SYNTHETIC RESIN 1 | UV CURABLE RESIN 1 | ITO 14.2%-BASE SYNTHETIC RESIN 1 |
| | Nd | 1.5963 | 1.7088 | 1.7127 | 1.6959 | 1.6356 | 1.5425 | 1.6356 | 1.5648 |
| | Ng | 1.6383 | 1.7599 | 1.7772 | 1.7516 | 1.6753 | 1.5630 | 1.6753 | 1.5941 |
| | NC | 1.5804 | 1.7003 | 1.6969 | 1.6853 | 1.6281 | 1.5362 | 1.6281 | 1.5544 |
| | NF | 1.6234 | 1.7331 | 1.7483 | 1.7246 | 1.6560 | 1.5549 | 1.6560 | 1.5826 |
| 5,6 | vd | 13.86 | 21.63 | 13.85 | 17.68 | 22.73 | 29.05 | 22.73 | 20.03 |
| | θgd | 0.9761 | 1.5594 | 1.2527 | 1.4155 | 1.4220 | 1.0963 | 1.4220 | 1.0517 |
| | θgF | 0.3459 | 0.8170 | 0.5604 | 0.6856 | 0.6895 | 0.4346 | 0.6895 | 0.4194 |
| 9,10 | Δθgd | −0.4049 | 0.2152 | −0.1283 | 0.0533 | 0.0826 | −0.2178 | 0.0826 | −0.2996 |
| 1,2 | ΔθgF | −0.3130 | 0.1888 | −0.0986 | 0.0424 | 0.0652 | −0.1688 | 0.0652 | −0.2147 |
| | φ | −0.00204 | 0.00781 | 0.00155 | −0.00143 | 0.01223 | −0.00360 | 0.00471 | −0.00093 |

FIG. 21A

| CONDITIONAL EXPRESSION | | FIRST EMBODIMENT | | | SECOND EMBODIMENT | THIRD EMBODIMENT | |
|---|---|---|---|---|---|---|---|
| | | G11-G21 | G12-G22 | G13-G23 | G11-G21 | G11-G21 | G12-G22 |
| 3 | $\Delta\theta gF1 \times \Delta\theta gF2$ | -1.400E-02 | -1.400E-02 | -1.515E-02 | -1.400E-02 | -6.209E-03 | -3.213E-03 |
| 4 | $\phi1 \times \phi2$ | -1.560E-07 | -9.136E-08 | -9.333E-08 | -2.011E-07 | -5.133E-07 | -1.587E-05 |
| 11 | $\Delta\theta gd1 \times \Delta\theta gd2$ | -2.475E-02 | -2.475E-02 | -2.317E-02 | -2.475E-02 | -1.013E-02 | -5.638E-05 |
| 12 | $\Delta\theta gF1 \times \Delta\theta gd1$ | 5.388E-03 | 5.388E-03 | 3.677E-02 | 5.388E-03 | 2.258E-03 | 1.265E-03 |
| 7 | $\Delta\theta gF1 \times \phi1$ | 3.496E-05 | 3.275E-05 | 5.148E-05 | 3.399E-05 | 6.474E-06 | 6.384E-04 |
| 8 | $\Delta\theta gF2 \times \phi2$ | 6.247E-05 | 3.907E-05 | 2.747E-05 | 8.267E-05 | 4.923E-04 | 7.989E-05 |

FIG. 21B

| CONDITIONAL EXPRESSION | | FOURTH EMBODIMENT | FIFTH EMBODIMENT | | SIXTH EMBODIMENT |
|---|---|---|---|---|---|
| | | G11-G21 | G11-G21 | G12-G22 | G11-G21 |
| 3 | $\Delta\theta gF1 \times \Delta\theta gF2$ | -5.910E-02 | -4.178E-03 | -1.101E-02 | -1.400E-02 |
| 4 | $\phi1 \times \phi2$ | -1.591E-05 | -2.213E-06 | -4.403E-05 | -4.362E-06 |
| 11 | $\Delta\theta gd1 \times \Delta\theta gd2$ | -8.715E-02 | -6.839E-03 | -1.799E-02 | -2.475E-02 |
| 12 | $\Delta\theta gF1 \times \Delta\theta gd1$ | 1.267E-01 | 1.265E-02 | 5.388E-03 | 5.388E-03 |
| 7 | $\Delta\theta gF1 \times \phi1$ | 6.377E-04 | -1.531E-04 | 7.976E-04 | 3.073E-04 |
| 8 | $\Delta\theta gF2 \times \phi2$ | 1.474E-03 | -6.042E-05 | 6.078E-04 | 1.988E-04 |

CEMENTED LENS AND OPTICAL SYSTEM HAVING THE SAME

BACKGROUND OF THE INVENTION

1. Field of the Invention

The present invention relates to a cemented lens and an optical system having the same, which are suitably used for the optical system of, for example, a silver halide film camera, digital still camera, video camera, digital video camera, telescope, binoculars, projector, or copying machine.

2. Description of the Related Art

Optical systems used for recent optical apparatuses such as digital cameras and video cameras are required to have high performance and be compact and lightweight as a whole. In general, as an optical system is miniaturized, chromatic aberration typified in particular by axial chromatic aberration and chromatic aberration of magnification tends to occur more frequently, and the optical performance tends to deteriorate.

It is difficult for an optical system using only an existing optical material such as glass to satisfy both the requirement for high performance and the requirement for miniaturization and weight reduction. As a means for solving such a problem, there is known a method of performing achromatization (chromatic aberration correction) by using an anomalous dispersion material as a material for some lenses of an optical system.

Recently, as a solid material (optical material) having an anomalous dispersion characteristic, a mixture obtained by dispersing Indium-Tin Oxide (ITO) fine particles or $TiO_2$ fine particles in a transparent medium or a combination of solid materials made of resins has been proposed. An optical system having undergone achromatization using lenses made of these materials is known (Japanese Patent Laid-Open No. 2007-163964).

Using a plurality of optical elements made of solid materials having anomalous dispersion characteristics in an optical system makes it easy to correct the chromatic aberration of the overall optical system and to obtain high optical performance while miniaturizing the overall optical system.

Conventionally, when a plurality of optical elements made of solid materials having anomalous dispersion characteristics, they are independently used at a plurality of positions in an optical system without being cemented.

In this arrangement, it is difficult to continuously manufacture optical elements made of solid materials having anomalous dispersion characteristics in a series of steps.

That is, it is necessary to use a plurality of means for manufacturing these elements, and hence a manufacturing process and a manufacturing apparatus become complicated.

In addition, if a plurality of optical elements made of solid materials having anomalous dispersion characteristics are separately arranged at different positions in an optical system, environmental fluctuations have different effects on the respective optical elements.

As a consequence, the optical performance of the respective optical elements changes differently. This greatly changes the optical performance as a whole. As described above, when a plurality of optical elements made of solid materials having anomalous dispersion characteristics are separately arranged, the environmental resistance may deteriorate.

Arranging a plurality of optical elements made of solid materials having anomalous dispersion characteristics facilitates chromatic aberration correction as compared with the case in which one such element is used. Even if, however, a plurality of optical elements made of solid materials having anomalous dispersion characteristics are simply arranged in an optical system, it is difficult to properly correct chromatic aberration and obtain high optical performance unless anomalous dispersion characteristic values, refracting power, and the like are properly set.

SUMMARY OF THE INVENTION

The present invention provides a cemented lens which can properly correct various types of aberration such as chromatic aberration, can be easily manufactured, and has excellent environmental resistance, and an optical system having the cemented lens.

According to the first aspect of the present invention, there is provided a cemented lens comprising a first optical element, a second optical element, and a third optical element respectively formed by different solid materials, the third optical element and the first optical element being cemented to each other, and the first optical element and the second optical element being cemented to each other, wherein both an incident surface and an exit surface of the first optical element and the second optical element are refracting surfaces, and the following conditional expressions are satisfied:

$|\Delta\theta gF1|>0.0272$ $|\Delta\theta gF2|>0.0272$ $\Delta\theta gF1 \times \Delta\theta gF2 < 0$ $\phi 1 \times \phi 2 < 0$ where $\Delta\theta F1$ and $\Delta\theta gF2$ are respectively anomalous dispersion characteristics of the materials for the first optical element and the second optical element with respect to a g line and an F line, and $\phi 1$ and $\phi 2$ are respectively refracting powers of the first optical element and the second optical element when both the incident surface and the exit surface of the first optical element and the second optical element are surfaces in contact with air.

According to the second aspect of the present invention, there is provided an optical system including a cemented lens, the cemented lens comprising a first optical element, a second optical element, and a third optical element respectively formed by different solid materials, the third optical element and the first optical element being cemented, and the first optical element and the second optical element being cemented, wherein both an incident surface and an exit surface of the first optical element and the second optical element are refracting surfaces, and the following conditional expressions are satisfied:

$|\Delta\theta gF1|>0.0272$ $|\Delta\theta gF2|>0.0272$ $\Delta\theta gF1 \times \Delta\theta gF2 < 0$ $\phi 1 \times \phi 2 < 0$ where $\Delta\theta gF1$ and $\Delta\theta gF2$ are respectively anomalous dispersion characteristics of the materials for the first optical element and the second optical element with respect to a g line and an F line, and $\phi 1$ and $\phi 2$ are respectively refracting powers of the first optical element and the second optical element when both the incident surface and the exit surface of the first optical element and the second optical element are surfaces in contact with air.

According to the third aspect of the present invention, there is provided a method of manufacturing a cemented lens, the cemented lens including a first optical element, a second optical element, and a third optical element respectively formed by different solid materials, the third optical element and the first optical element being cemented, and the first optical element and the second optical element being cemented, wherein an incident surface and an exit surface of the first optical element and the second optical element being refracting surfaces, and the following conditional expressions being satisfied:

$|\Delta\theta gF1|>0.0272$ $|\Delta\theta gF2|>0.0272$ $\Delta\theta gF1\times\Delta\theta gF2<0$ $\phi 1\times\phi 2<0$ where $\Delta\theta gF1$ and $\Delta\theta gF2$ are respectively anomalous dispersion characteristics of the materials for the first optical element and the second optical element with respect to a g line and an F line, and $\phi 1$ and $\phi 2$ are respectively refracting powers of the first optical element and the second optical element when both the incident surface and the exit surface of the first optical element and the second optical element are surfaces in contact with air, the method comprising steps of forming the first optical element on the third optical element, and forming the second optical element on the first optical element.

Further features of the present invention will become apparent from the following description of exemplary embodiments with reference to the attached drawings.

BRIEF DESCRIPTION OF THE DRAWINGS

FIG. 2 is a graph for explaining chromatic aberration coefficient/wavelength characteristics in the present invention;

FIG. 18 is a view showing refractive indexes Nd, Ng, NC, and NF of a UV curable resin 1, UV curable resin 2, base synthetic resin 1, ITO, and $TiO_2$ with respect to a d line, g line, C line, and F line, Abbe numbers vd of the materials with respect to a d line, partial dispersion ratios $\theta gF$ of the materials with respect to a g line and F line, and partial dispersion ratios $\theta gd$ of the materials with respect to a g line and d line;

FIG. 19 is a view showing the linear expansion coefficients of optical materials and the physical values of refractive index changes with changes in temperature;

FIGS. 20A to 20C are views showing numerical values such as the refractive indexes, Abbe numbers, partial dispersion ratios, and powers of a first optical element G1j and second optical element G2j with respect to a d line, g line, C line, and F line; and FIGS. 21A and 21B are views showing numerical values corresponding to conditional expressions (3), (4), (7), (8), (11), and (12).

DESCRIPTION OF THE EMBODIMENTS

Figure 1:
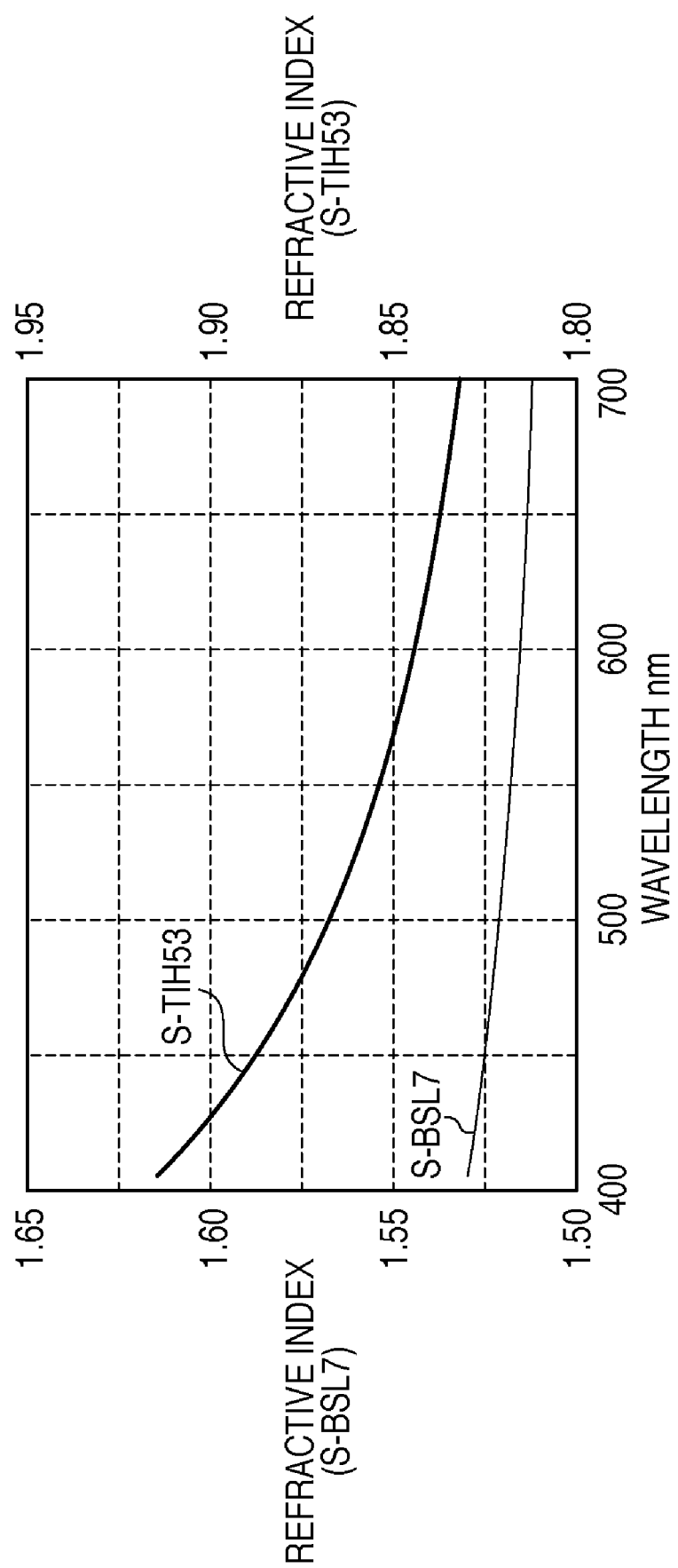
FIG. 1 is a graph for explaining refractive index/wavelength characteristics of general glass materials.

A cemented lens and an optical system having the lens according to the present invention will be exemplarily described below.

A cemented lens according to a preferred embodiment of the present invention includes first, second, and third optical elements respectively formed by different solid materials (with different partial dispersion ratios). In this case, an optical element (third optical element) such as a transparent plate is cemented to the first optical element, and the first and second optical elements are cemented to each other.

Both the incident surface and exit surface of the cemented first and second optical elements are refracting surfaces. These elements are cemented to at least one surface of the third optical element so as to implement a refraction effect.

The cemented lens according to the preferred embodiment of the present invention is used as the optical system or part of the optical system of an optical apparatus such as a digital camera, silver halide film camera, digital video camera, video camera, telescope, binoculars, copying machine projector, or the like.

The respective solid materials forming the first, second, and third optical elements are materials which are solid when applied and used for an optical system. These materials can be in any state before they are used for an optical system at the time of manufacture. For example, even a liquid material at the time of manufacture corresponds to a solid material defined in this case if the material is cured into a solid material.

In addition, the first and second optical elements mean, for example, refracting lenses which generate powers (refracting powers) by refraction effects, but do not include any diffractive optical elements which generate powers by diffraction effects.

Let $\Delta\theta gF1$ and $\Delta\theta gF2$ be the anomalous dispersion characteristics of the first and second optical elements, which form part of the cemented lens according to the preferred embodiment of the present invention, with respect to a g line and F line. Let $\phi 1$ and $\phi 2$ be the refracting powers of the first and second optical elements when both the incident surface and exit surface of the first and second optical elements are surfaces in contact with air.

In this case, the following conditional expressions are satisfied:

$$|\Delta\theta gF1|>0.0272 \quad (1)$$

$$|\Delta\theta gF2|>0.0272 \quad (2)$$

$$\Delta\theta gF1 \times \Delta\theta gF2<0 \quad (3)$$

$$\phi 1 \times \phi 2<0 \quad (4)$$

In the preferred embodiment of the present invention, the first and second optical elements forming part of the cemented lens preferably satisfy one or more of the following conditions. This makes it possible to obtain effects corresponding to the respective conditions.

Let $\nu d1$ and $\nu d2$ be Abbe numbers of the materials for the first and second optical elements with respect to a d line.

Let $\Delta\theta gd1$ and $\Delta\theta gd2$ be the anomalous dispersion characteristics of materials for the first and second optical elements with respect to a g line and d line. In this case, it is preferable to satisfy one or more of the following conditional expressions:

$$\nu d1<60 \quad (5)$$

$$\nu d2<60 \quad (6)$$

$$\Delta\theta gF1 \times \phi 1>0 \quad (7)$$

$$\Delta\theta gF2 \times \phi 2>0 \quad (8)$$

$$|\Delta\theta gd1|>0.038 \quad (9)$$

$$|\Delta\theta gd2|>0.038 \quad (10)$$

$$\Delta\theta gd1 \times \Delta\theta gd2<0 \quad (11)$$

$$\Delta\theta gF1 \times \Delta\theta gd1>0 \quad (12)$$

In the preferred embodiment of the present invention, anomalous dispersion characteristics $\Delta\theta gF$ and $\Delta\theta gd$ and Abbe numbers $\nu d$ of solid materials can be the following.

Let Ng, NF, Nd, and NC be refractive indexes with respect to a g line (435.8 nm), F line (486.1 nm), d line (587.6 nm), and C line (656.3 nm) of Fraunhofer lines. In this case, the Abbe number $\nu d$, a partial dispersion ratio $\theta gd$ associated with a g line and d line, and a partial dispersion ratio $\theta gF$ associated with a g line and F line can be the following:

$$\nu d=(Nd-1)/(NF-NC)$$

$$\theta gd=(Ng-Nd)/(NF-NC)$$

$$\theta gF=(Ng-NF)/(NF-NC)$$

The anomalous dispersion characteristic $\Delta\theta gd$ associated with a g line and d line and the anomalous dispersion characteristic $\Delta\theta gF$ associated with a g line and F line can be the following. The partial dispersion ratios of general optical materials change in a similar manner with changes in Abbe number. In this case, standard values $\theta gd0$ and $\theta gF0$ of partial dispersion ratios as a function of the Abbe number $\nu d$ associated with a d line are represented as follows:

$$\theta gd0=-1.687\times 10^{-7}\nu d^3+5.702\times 10^{-5}\nu d^2-6.603\times 10^{-3}\nu d+1.462$$

$$\theta gF0=-1.665\times 10^{-7}\nu d^3+5.213\times 10^{-5}\nu d^2-5.656\times 10^{-3}\nu d+0.7278$$

In this case, the anomalous dispersion characteristics indicate differences from these standard values. That is, the anomalous dispersion characteristics $\Delta\theta gd$ and $\Delta\theta gF$ are respectively represented by $$\Delta\theta gd=\theta gd-\theta dg0$$

$$\Delta\theta gF=\theta gF-\theta gF0$$

In the preferred embodiment of the present invention, when the first and second optical elements forming part of a cemented lens are to be formed on the convex surface of the third optical element (lens), the elements preferably have shapes satisfying the following conditions:

$$\phi 1<0 \quad (13)$$

$$0<\phi 2 \quad (13)$$

In contrast, when the first and second optical elements are to be formed on the concave surface of the third optical element (lens), the elements preferably have shapes satisfying the following conditions:

$$0<\phi 1 \quad (14)$$

$$\phi 2<0 \quad (14)$$

The technical meanings of the respective conditional expressions will be described next.

In the present invention, the first and second optical elements forming the cemented lens are preferably made of solid materials satisfying conditional expressions (1) to (3) and have shapes (lens shapes) based on refracting powers satisfying conditional expression (4).

In other words, as solid materials forming the first and second optical elements, solid materials having partial dispersion ratios which are respectively larger and smaller than that of a general optical material are preferably used. In addition, the refracting powers of the first and second optical elements have different signs. Using such an arrangement facilitates properly correcting the chromatic aberration of the optical system.

Solid materials satisfying conditional expressions (5) and (6) are preferably used for the first and second optical elements. This makes it possible to correct chromatic aberration more easily.

The optical elements preferably have refracting powers satisfying conditional expressions (7) and (8). This further facilitates properly correcting chromatic aberration.

Concrete examples of solid materials (to be also referred to as "optical materials" hereinafter) satisfying conditional expressions (1) and (2) are, for example, resins.

Among various resins, a UV curable resin 1, UV curable resin 2, N-polyvinylcarbazole, and the like, in particular, are optical materials satisfying conditional expressions (1) and (2).

Note that materials to be used are not limited to these materials as long as they satisfy conditional expressions (1) and (2).

In addition, mixtures obtained by dispersing the following inorganic oxide nanoparticles in synthetic resins are also optical materials satisfying conditional expressions (1) and (2). Inorganic oxides include, for example, $TiO_2$ (Nd=2.304, vd=13.8), $Nb_2O_5$ (Nd=2.367, vd=14.0), and ITO (Nd=1.8571, vd=5.69). Such materials also include $CrO_3$ (Nd=2.2178, vd=13.4), $BaTiO_3$ (Nd=2.4362, vd=11.3), and the like.

An optical material satisfying conditional expression (1) or (2) can be obtained by dispersing $TiO_2$ nanoparticles, among these inorganic oxides, in a synthetic resin at a proper volume ratio.

In addition, when ITO (Indium-Tin-Oxide) nanoparticles are dispersed in a synthetic resin at a proper volume ratio, an optical material satisfying conditional expression (1) or (2) described above can be obtained. Note that materials to be used are not limited to these materials as long as they satisfy conditional expressions (1) and (2).

FIG. 18 shows the refractive indexes Nd, Ng, NC, and NF of the above materials with respect to a d line, g line, C line, and F line, the Abbe numbers vd of the materials with respect to a d line, the partial dispersion ratios θgF of the materials with respect to a g line and F line, and partial dispersion ratios θgd of the materials with respect to a g line and d line.

Note that the base synthetic resin 1 in Table 1 represents a transparent medium in which inorganic oxide fine particles such as $TiO_2$ or ITO fine particles are dispersed.

Each embodiment properly corrects chromatic aberration by using a cemented element obtained by cementing two optical elements made of optical materials having partial dispersion ratios which are respectively larger and smaller than that of a general optical material.

In the refractive index/wavelength characteristic (dispersion characteristic) of an optical material, the Abbe number represents the slope of the dispersion characteristic curve, and the partial dispersion ratio represents the degree of curve of the dispersion characteristic curve.

In general, the refractive index of an optical material on the short wavelength side is higher than that on the long wavelength side, and the Abbe number vd of the material with respect to a d line, the partial dispersion ratio θgF associated with a g line and F line, and the partial dispersion ratio θgd associated with a g line and d line respectively take positive values.

For this reason, this dispersion characteristic curve (refractive index characteristic with respect to wavelength) is a curve convexing downward. A change in refractive index with a change in wavelength increases toward the short wavelength side.

FIG. 1 shows the refractive index/wavelength characteristics of the trade name S-BSL7 (Nd=1.516, vd=64.1) and the trade name S-TIH53 (Nd=1.847, vd=23.8) available from OHARA.

The trade name S-TIH53, which is a high-dispersion material whose Abbe number vd is small, exhibits a refractive index/wavelength characteristic curve with a larger slope and a larger change amount in a short wavelength region. As described above, a high-dispersion optical material with a smaller value of the Abbe number vd tends to have a larger value of the partial dispersion ratio θgF associated with a g line and F line.

The partial dispersion ratio of a general optical material tends to exhibit an almost linear change in a low dispersion region with a change in Abbe number and to increase in the degree of change as the dispersion increases. An optimal material falling outside such a distribution is an optical material having an anomalous dispersion characteristic.

Optical materials having such anomalous dispersion characteristics, for example, exhibit low transmittances relative to general optical materials, decrease in moldability with an increase in thickness, and tend to vary in performance with environmental changes. For these reasons, it is important to use such materials upon decreasing their thicknesses.

Using both an optical material having a large partial dispersion ratio and an optical material having a small partial dispersion ratio can obtain a proper achromatizing effect while suppressing an increase in the thickness of each material.

The correction of the chromatic aberration of an optical system comprising a dioptric system portion GNL using an optical material having a large partial dispersion ratio, a dioptric system portion GL using an optical material having a small partial dispersion ratio, and a dioptric system portion G using an optical material having a general partial dispersion ratio will be described below.

Referring to FIG. 2, a broken line G represents a chromatic aberration coefficient/wavelength characteristic curve (to be also written as a chromatic aberration coefficient curve hereinafter) in a state in which the chromatic aberration of the dioptric system portion G serving as a partial system has been corrected to some extent. Curves GNL and GL represent the chromatic aberration coefficient curves of the dioptric system portions GNL and GL, respectively. The curve after chromatic aberration correction represents the chromatic aberration coefficient curve obtained when the chromatic aberration is corrected by introducing the dioptric system portions GNL and GL into the dioptric system portion G.

In general, a chromatic aberration coefficient curve in an optical system whose chromatic aberration is corrected takes balance with chromatic aberration while the bend remains on the short wavelength side as indicated by the broken line G. It is difficult to correct chromatic aberration more properly by using only general optical materials.

When the dioptric system portion GNL is introduced into the dioptric system portion G to provide a proper power, the slope of a chromatic aberration coefficient changes around a design reference wavelength. At this time, since the partial dispersion ratio of the dioptric system portion GNL is larger than that of a general optical material, the chromatic aberration coefficient curve changes more on the short wavelength side.

In this case, correcting only the slope of the chromatic aberration coefficient curve generated in the dioptric system portion GNL can cancel out the bend of the dioptric system portion G in the short wavelength region and properly correct the chromatic aberration. When a general optical material is used to correct the slope of a chromatic aberration coefficient curve, the curve has a bend on the short wavelength side in accordance with the value of a partial dispersion ratio. This effect cancels out the color correcting effect of the dioptric system portion GNL in the short wavelength region. As a result, the color correcting effect of the overall optical system decreases. In this case, in order to obtain a sufficient color correcting effect, it is necessary to increase the power of the dioptric system portion GNL and increase the color correcting effect in the short wavelength region. If, however, the power of the dioptric system portion GNL is increased, the resultant structure increases in thickness as a lens.

If, therefore, the dioptric system portion GL is used to correct the slope of the chromatic aberration coefficient curve of the dioptric system portion GNL, chromatic aberration can be easily corrected.

The dioptric system portion GL comprises an optical system having a partial dispersion ratio smaller than that of a general optical material. For this reason, the chromatic aberration coefficient curve relatively exhibits linearity.

That is, in this case, the effect of canceling out the correction of chromatic aberration in the short wavelength region can be suppressed more than in the case in which the slope of the chromatic aberration coefficient curve of the dioptric system portion GNL is corrected by using a general optical material.

That is, it is possible to properly correct chromatic aberration without increasing the powers of the dioptric system portions GNL and GL.

As described above, according to the cemented lens of the preferred embodiment of the present invention, it is possible to simultaneously correct both the slope component and bend component of a chromatic aberration coefficient curve relatively easily while suppressing increases in the thicknesses of the dioptric system portions GNL and GL. This can properly correct chromatic aberration in the entire wavelength range in the visible region.

Let $\Delta\phi$ be a power change on the surface of a refractive lens (dioptric element), $\nu d$ be the Abbe number of a material, and h and H be the heights from the optical axis to the positions at which a paraxial on-axis ray and a pupil paraxial ray pass through the lens surface.

A paraxial on-axis ray is a paraxial ray obtained by normalizing the focal length of the overall optical system to 1 and applying light with a height of 1 from the optical axis parallelly to the optical axis of the optical system. A pupil paraxial ray is a paraxial ray, of rays striking the optical system at −45° with respect to the optical axis, which passes through the intersection of the incident pupil of the optical system and the optical axis, with the focal length of the overall optical system being normalized to 1. Assume that the clockwise and counterclockwise incident angles of light to the optical system when measured from the optical axis respectively take positive and negative values, respectively.

At this time, a change $\Delta L$ in axial chromatic aberration on the lens surface and a change $\Delta T$ in chromatic aberration of magnification can be expressed as follows:

$$\Delta L = h^2 \cdot \Delta\phi/\nu d \quad (a)$$

$$\Delta T = h \cdot H \cdot \Delta\phi/\nu d \quad (b)$$

As is obvious from equations (a) and (b), the changes $\Delta L$ and $\Delta T$ in the respective aberration coefficients with changes in power on the lens surface increase as the absolute value of the Abbe number $\nu d$ decreases (i.e., the dispersion increases).

Using a high-dispersion material with a small absolute value of the Abbe number $\nu d$ can obtain necessary chromatic aberration with a small power change amount $\Delta\phi$. This makes it possible to control chromatic aberration without greatly influencing spherical aberration, coma, astigmatism, and the like from the viewpoint of aberration. This therefore indicates that that the independency of chromatic aberration correction improves.

In contrast, using a low-dispersion material (with a large Abbe number) will increase the power change amount $\Delta\phi$ for obtaining necessary chromatic aberration. This greatly changes various types of aberration such as spherical aberration and degrades the independency of chromatic aberration correction. As a consequence, the first and second optical elements forming the cemented lens are preferably made of high-dispersion materials.

As is obvious from equations (a) and (b), the change amount $\Delta L$ in axial chromatic aberration and the change amount $\Delta T$ in chromatic aberration of magnification are determined by the values of the heights h and H.

In order to properly correct the chromatic aberration of an optical system, therefore, a cemented lens according to the present invention is preferably introduced to a place where the heights h and H have proper values.

Considering the signs of the aberration coefficients $\Delta L$ and $\Delta T$, it is obvious from equations (a) and (b) that the signs are determined by the signs of the heights h and H. In general, the height h always takes a positive value, and the height H takes a negative value on the object side viewed from the intersection of a pupil paraxial ray and the optical axis and a positive value on the image side.

Since residual chromatic aberration differs depending on an optical system, it is necessary to determine, for each optical system, the position where a cemented lens should be placed in the optical system.

For example, in a telephoto type optical system used for a telephoto lens, chromatic aberration can be properly corrected by using a cemented lens according to the present invention at a place where the height h on the object side is larger than an aperture stop. In addition, in a retrofocus type optical system used for a wide angle lens or the like, chromatic aberration can be properly corrected by using the cemented lens of the present invention at a place closer to the image side than the aperture stop.

The first and second optical elements forming the cemented lens are preferably cemented to each other.

This is because cementing the first and second optical elements makes the heights h and H take almost the same values.

The powers $\phi 1$ and $\phi 2$ of the first and second optical elements take different signs according to conditional expression (4), and hence cancel out each other. As a consequence, the synthetic power of the first and second optical elements decreases. Considering various types of aberration, the aberration of the first optical element cancels out that of the second optical element. As a result, influences on various types of aberration can be suppressed.

At this time, chromatic aberration can be properly corrected by using the difference in dispersion characteristic. The independency of such correction of chromatic aberration holds when the first and second optical elements are tightly cemented to each other to make the heights h and H take almost the same values in the first and second optical elements. That is, when the first and second optical elements are separately arranged, it is relatively difficult to properly cancel out various types of aberration.

In consideration of changes in performance with environmental changes, it is preferable to tightly cement the first and second optical elements to each other. Materials having anomalous dispersion characteristics such as solid materials forming the first and second optical elements tend to have different physical values such as linear expansion coefficients and refractive index variations with changes in temperature as compared with general glass materials such as PC and PMMA which are polymeric materials.

FIG. 19 shows the physical values of linear expansion coefficients and refractive index changes with changes in temperature of optical materials. FIG. 19 shows the physical values of the trade name S-FSL5 and the trade name S-LAH58 available from OHARA as general glass materials and PMMA and PC as polymeric materials.

As is obvious from Table 2, optical materials satisfying conditional expressions (1) and (2) have larger absolute values of refractive index changes dn/dT with changes in temperature than general glass materials, and tend to vary in performance with changes in temperature. In addition, the linear expansion coefficients of such optical materials are often greatly different from those of general glass materials, and may undergo surface deformation or distortion with changes in temperature.

The cemented lens according to the preferred embodiment of the present invention can easily suppress variations in performance with changes in refractive index due to changes in temperature because the powers of the first and second optical elements are made to take different signs so as to satisfy conditional expression (4).

This is because, since the powers of the respective elements take different signs, performance variations are in a relationship to cancel out each other.

If the first and second optical elements are tightly cemented to each other, the heights h and H take almost the same value, and various types of aberration vary to similar degrees. This makes it possible to further suppress the variations.

In addition, the first and second optical elements are relatively high in chromatic aberration sensitivity due to an assembly error or the like because the elements have high chromatic aberration correcting effects.

For this reason, using the above shapes based on refracting powers makes it possible to suppress chromatic aberration sensitivity due to an assembly error or the like, thus facilitating the manufacture.

It is also easy to independently correct chromatic aberration by reducing the difference in refractive index between the materials forming the first and second optical elements with respect to a d line. As the refractive index difference with respect to a d line decreases, the refraction of a d line at the joint interface between the first and second optical elements decreases.

At this time, since the these optical elements have a refractive index difference with respect to a ray having another wavelength due to the difference in dispersion characteristic, refraction occurs at the interface. That is, it is possible to obtain the effect of independently correcting chromatic aberration by controlling only refraction at a wavelength other than that of a d line.

If the solid materials forming the first and second optical elements are resins or the like, use of a tightly cemented shape allows the elements to be continuously molded.

When, for example, a cemented lens is to be manufactured by forming the first and second optical elements on the third optical element, the following steps are used. First of all, a liquid material forming the first optical element is dropped on the transparent surface of the third optical element, and is molded into a desired shape by using a molding tool.

Thereafter, a liquid material forming the second optical element is dropped on the molded first optical element, and is molded into a desired shape by using a molding tool.

With this process, a cemented lens can be manufactured. In this case, using a molding tool with an aspherical shape for the molding of the first optical element can easily form the interface with the second optical element into an aspherical shape.

Assume that the first and second optical elements are not cemented. In this case, a plurality of jigs for fixing the optical elements at the time of molding of the respective optical elements need to be prepared, if the elements have different shapes. In addition, since the step of molding the first optical element differs from the step of molding the second optical element, the steps themselves tend to become complicated. This also makes it difficult to simplify an apparatus for molding, resulting in difficulty in molding.

In contrast to this, if the first and second optical elements are cemented, it is necessary to prepare only one type of dedicated jig for fixing the optical elements owing to continuous molding.

There is no need to prepare a plurality of molding machines for performing these molding steps. The steps can also be simplified. Therefore, there is no need to use an apparatus for performing complicated processing. These facilitate molding.

In addition, continuous molding facilitates simultaneously performing eccentricity adjustment for the first and second optical elements, and can perform molding with a simple process.

Whether to form one of the first and second optical elements forming part of a cemented lens by using a solid material having a large partial dispersion ratio and to form the other optical element by using a solid material having a small partial dispersion ratio can be selected in accordance with the physical values of the solid materials and the characteristics of the optical system to be introduced.

In an optical system to be introduced, for example, a preferred optical element arrangement can be determined in accordance with performance sensitivity to changes in curvature.

Figure 3A:
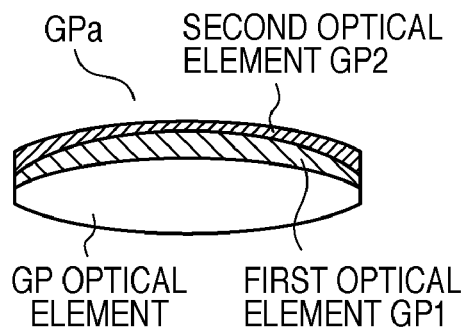
FIGS. 3A and 3B are sectional views showing a case in which a cemented lens of the present invention is cemented to the convex surface of an optical element.
Figure 3B:
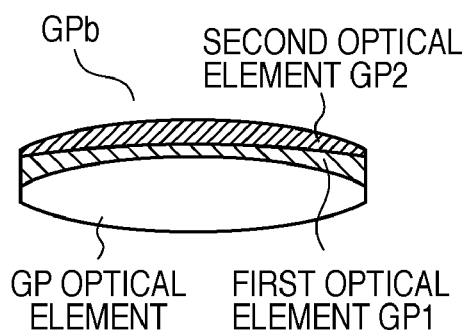

FIGS. 3A and 3B are views for explaining the shapes of cemented lenses GPa and GPb in a case in which first and second optical elements GP1 and GP2 are arranged on the convex surface of a third optical element GP.

The cemented lens GPa in FIG. 3A exemplifies a case in which the first optical element GP1 having positive power (refracting power) is placed on the convex surface of the third optical element GP, and the second optical element GP2 having negative power is cemented to the first optical element GP1.

The cemented lens GPb in FIG. 3B exemplifies a case in which the first optical element GP1 having negative power is placed on the convex surface of the third optical element GP, and the second optical element GP2 having positive power is cemented to the first optical element GP1.

Figure 4A:
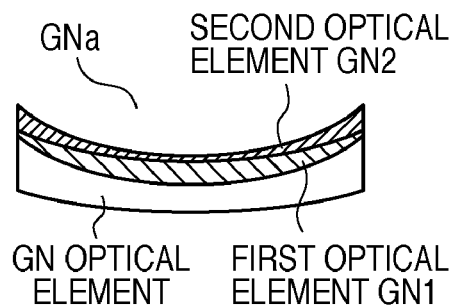
FIGS. 4A and 4B are sectional views showing a case in which a cemented lens of the present invention is cemented to the concave surface of an optical element.
Figure 4B:
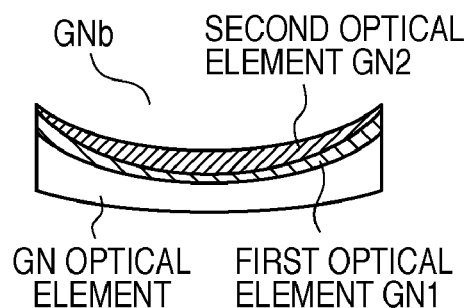

FIGS. 4A and 4B are views for explaining the shapes of cemented lenses GNa and GNb in a case in which first and second optical elements GN1 and GN2 are arranged on the concave surface of an optical element GN.

The cemented lens GNa in FIG. 4A exemplifies a case in which the first optical element GN1 having positive power is placed on the concave surface of the third optical element GN, and the second optical element GN2 having negative power is cemented to the first optical element GN1.

The cemented lens GNb in FIG. 4B exemplifies a case in which the first optical element GN1 having negative power is placed on the concave surface of the third optical element GN, and the second optical element GN2 having positive power is cemented to the first optical element GN1.

It is obvious from the comparison between the curvature of the interface between the first and second optical elements GP1 and GP2 in FIG. 3A and that in 3B that the curvature in FIG. 3B is smaller.

It is obvious from the comparison between the curvature of the interface between the first and second optical elements GN1 and GN2 in FIG. 4A and that in 4B that the curvature in FIG. 4A is smaller.

When the cemented lens of the present invention is to be used for an optical system having high performance sensitivity to changes in curvature, each surface preferably has a smaller curvature. In this case, as the arrangement of the cemented lens of the present invention, for example, an arrangement like that shown in FIG. 3B or 4A is preferably used. That is, it is preferable to satisfy conditional expression (13) or (14).

When the cemented lens is to be used for an optical system in which a ghost tends to occur due to reflection by a lens surface, the arrangement of the optical elements is preferably determined so as to take a curvature that reduces the ghost.

Other factors which determine the arrangement of the optical elements include the absorptions, linear expansion coefficients, and the like of the solid materials. Consider a case in which the two interfaces of the first optical element GP1 are tightly cemented to optical elements, and one of the interfaces of the second optical element GP2 is in contact with air, as in the case of the cemented lens GPa in FIG. 3A.

In this case, if the first and second optical elements GP1 and GP2 absorb water from an outside atmosphere, the second optical element GP2 having a larger surface in contact with the outside is more susceptible to the influence of water absorption. In contrast, the first optical element GP1 is less susceptible to the influence of water absorption from the outside atmosphere.

When the cemented lens of the present invention is to be used for an optical system in which the absorption of water by the solid materials tend to influence the optical performance, for example, a solid material having larger absorption is preferably located so as to decrease the surface area in contact with the outside. That is, in the case of the cemented lens GPa like that shown in FIG. 3A, a material having smaller absorption is preferably used as a solid material forming the second optical element GP2 having a large surface area in contact with an outside atmosphere. Using such an arrangement facilitates sealing the first optical element GP1 with the second optical element GP2.

In general, as the difference in linear expansion coefficient between solid materials tightly cemented to each other increases, distortion of the lens surfaces due to a rise in temperature or the like increases, and peeling occurs. In contrast, decreasing the difference can suppress the occurrence of distortion and peeling of the lens surfaces due to environmental variations such as a rise in temperature. That is, it is possible to improve the environmental resistance of the cemented lens of the present invention by using materials which decrease the difference in linear expansion coefficient as adjacent solid materials.

The cemented lens of the present invention is designed to correct various types of aberration such as chromatic aberration by combining general optical materials. For this reason, in order to correct aberration, it is necessary for the partial dispersion ratios of these materials to have anomalous dispersion characteristics. Increasing the anomalous dispersion characteristics too much makes it difficult to correct chromatic aberration.

If a lens made of a material having a characteristic greatly different from that of a general optical material is used, the dependence of chromatic aberration coefficient on wavelength on the lens surface greatly changes in particular. In order to correct this large change to perform chromatic aberration correction, it is also necessary to greatly change the power of the other lens. In this case, since a large change in power greatly influences spherical aberration, coma, astigmatism, or the like, it is difficult to correct aberration.

For this reason, chromatic aberration can be corrected more properly by setting the numerical range of the anomalous dispersion characteristic $\Delta\theta gF1$ represented by conditional expression (1) associated with the solid material forming the first optical element to the following range.

$$0.0272 < \Delta\theta gF1 < 0.2832$$

or $$-0.4278 < \Delta\theta gF1 < -0.0528 \quad (1a)$$

From the viewpoint of aberration correction, it is further preferable to set the numerical range of conditional expression (1a) to the following range.

$$0.0320 < \Delta\theta gF1 < 0.2832$$

or $$-0.4278 < \Delta\theta gF1 < -0.0778 \quad (1b)$$

Chromatic aberration can be corrected more properly by setting the numerical range of the anomalous dispersion characteristic $\Delta\theta gF2$ represented by conditional expression (2) associated with the solid material forming the second optical element to the following range.

$$0.0272 < \Delta\theta gF2 < 0.2832$$

or $$-0.4278 < \Delta\theta gF2 < -0.0528 \quad (2a)$$

From the viewpoint of aberration correction, it is further preferable to set the numerical range of conditional expression (2a) to the following range.

$$0.0320 < \Delta\theta gF2 < 0.2832$$

or $$-0.4278 < \Delta\theta gF2 < -0.0778 \quad (2b)$$

Chromatic aberration can be corrected further properly by setting the numerical ranges of the Abbe numbers $vd1$ and $vd2$ associated with the first and second optical elements represented by conditional expressions (5) and (6) to the following ranges.

$$vd1 < 50 \quad (5a)$$

$$vd2 < 50 \quad (6a)$$

More preferably, the numerical ranges of conditional expressions (5a) and (6a) are set to the following ranges.

$$vd1 < 45 \quad (5b)$$

$$vd2 < 45 \quad (6b)$$

More preferably, the numerical ranges of conditional expressions (5b) and (6b) are set to the following ranges.

$$vd1 < 40 \quad (5c)$$

$$vd2 < 40 \quad (6c)$$

In addition, in the optical materials for the first and second optical elements which satisfy conditional expressions (1) to (4), the anomalous dispersion characteristics associated with a g line and d line satisfy conditional expressions (9) to (12). In this case, it is easy to properly correct chromatic aberration in a wavelength range in the visible region from a short wavelength to an intermediate wavelength.

Setting the numerical range of the anomalous dispersion characteristic $\Delta\theta gd1$ of conditional expression (9) associated with the first optical element to the following range facilitates further properly correcting chromatic aberration.

$$0.038 < \Delta\theta gd1 < 0.347$$

or $$-0.562 < \Delta\theta gd1 < -0.062 \quad (9a)$$

More preferably, the numerical range of conditional expression (9a) is preferably set to the following range.

$$0.043 < \Delta\theta gd1 < 0.347$$

or $$-0.562 < \Delta\theta gd1 < -0.112 \quad (9b)$$

Setting the numerical range of the anomalous dispersion characteristic $\Delta\theta gd2$ of conditional expression (10) associated with the solid material forming the second optical element to the following range facilitates further properly correcting chromatic aberration.

$$0.038 < \Delta\theta gd2 < 0.347$$

or $$-0.562 < \Delta\theta gd2 < -0.062 \quad (10a)$$

More preferably, the numerical range of conditional expression (10a) is preferably set to the following range.

$$0.043 < \Delta\theta gd2 < 0.347$$

or $$-0.562 < \Delta\theta gd2 < -0.112 \quad (10b)$$

In each embodiment, the cemented lens is formed by providing the first and second optical elements made of optical materials satisfying conditional expressions (1) and (2), as layers each having refracting power, on the lens surface of the third optical element (optical element). The cemented lens is used in the optical system.

The refracting surface comprising these optical elements can have an aspherical shape. This makes it easy to correct chromatic aberration flare such as chromatic spherical aberration. If an interface is formed by these optical elements, and an atmosphere such as air or optical materials having a large refractive index difference, chromatic aberration can be changed relatively greatly with a small change in curvature of the interface. This facilitates correcting chromatic aberration.

The concrete embodiments of the optical system using the cemented lens according to the present invention will be described below.

Figure 5:
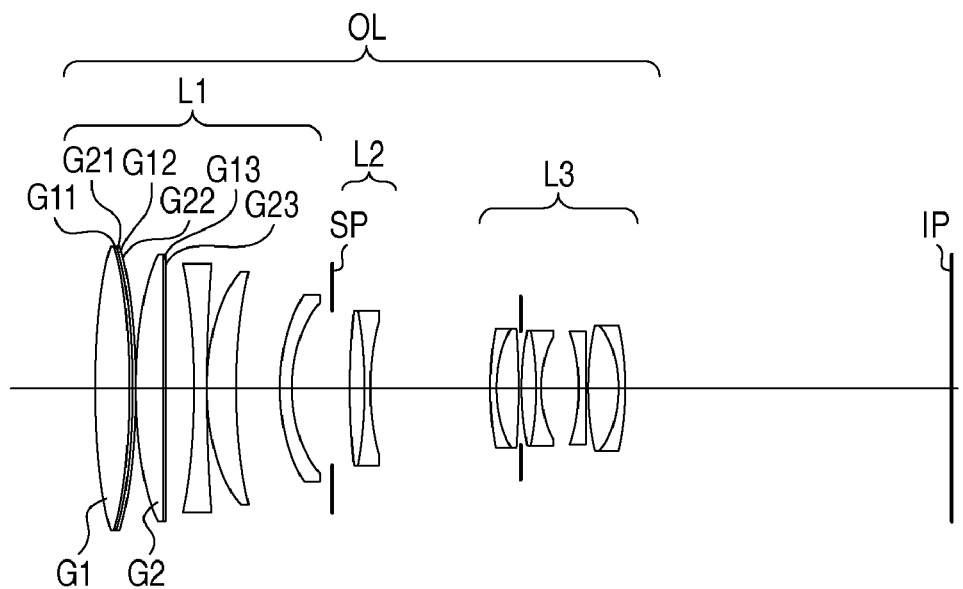
FIG. 5 is a sectional view of an optical system according to the first numerical embodiment.
Figure 6:
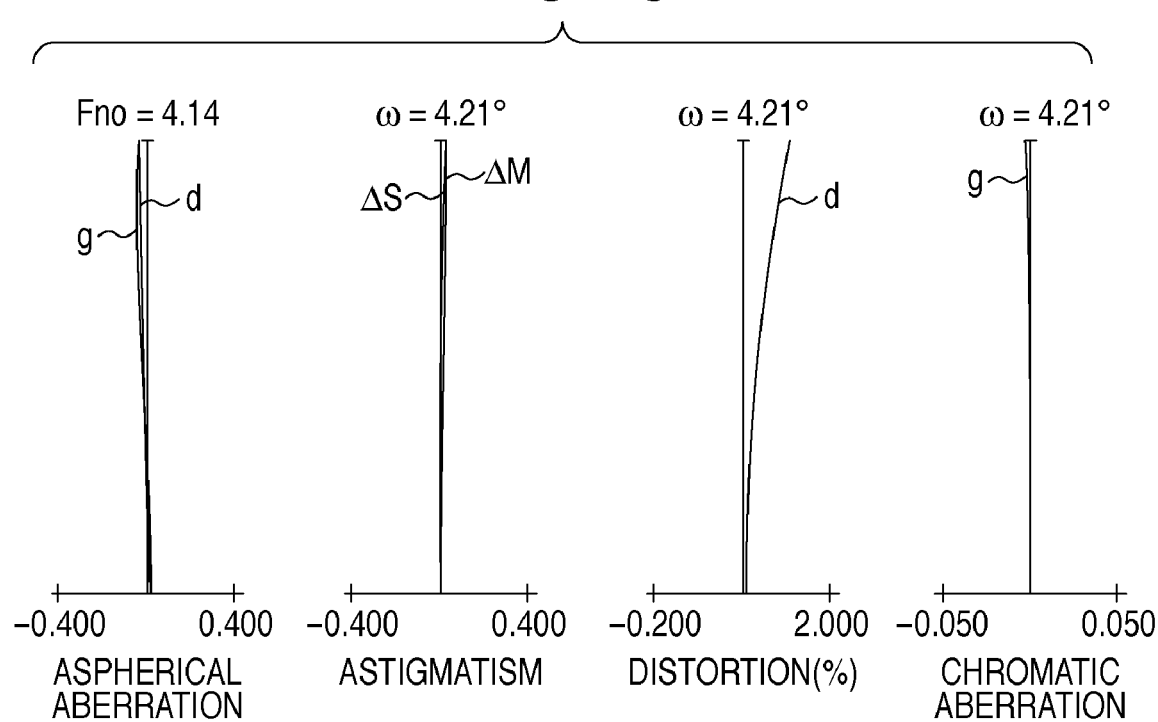
FIG. 6 is an aberration chart of the first numerical embodiment.

FIG. 5 is a sectional view of the lenses of an optical system of the first embodiment. FIG. 6 is an aberration chart in a case in which the optical system of the first embodiment is in focus on an infinite-distance object.

Figure 7:
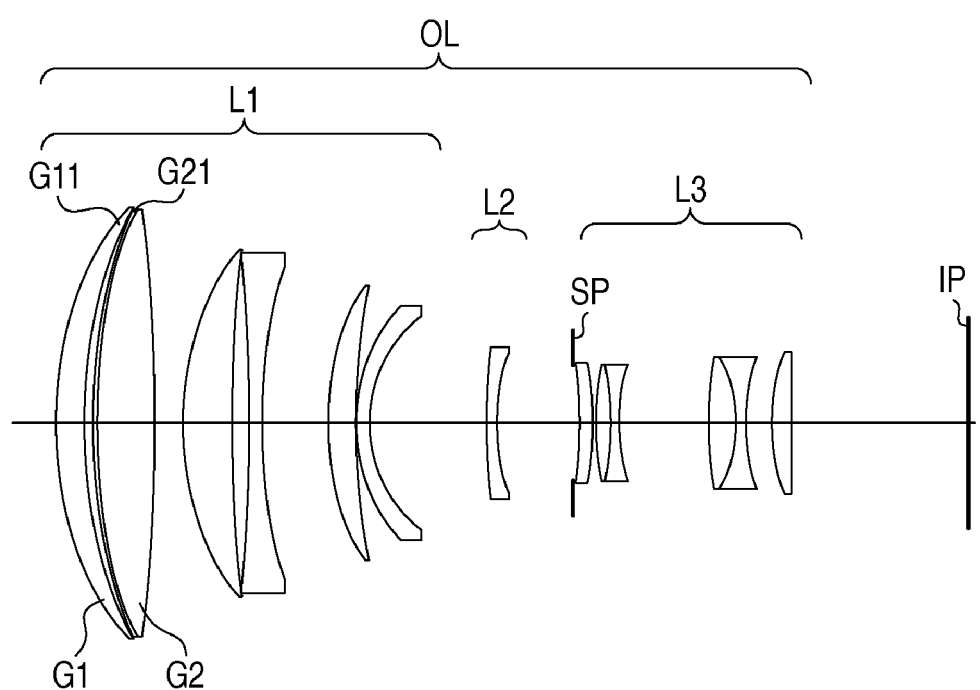
FIG. 7 is a sectional view of an optical system of the second numerical embodiment.
Figure 8:
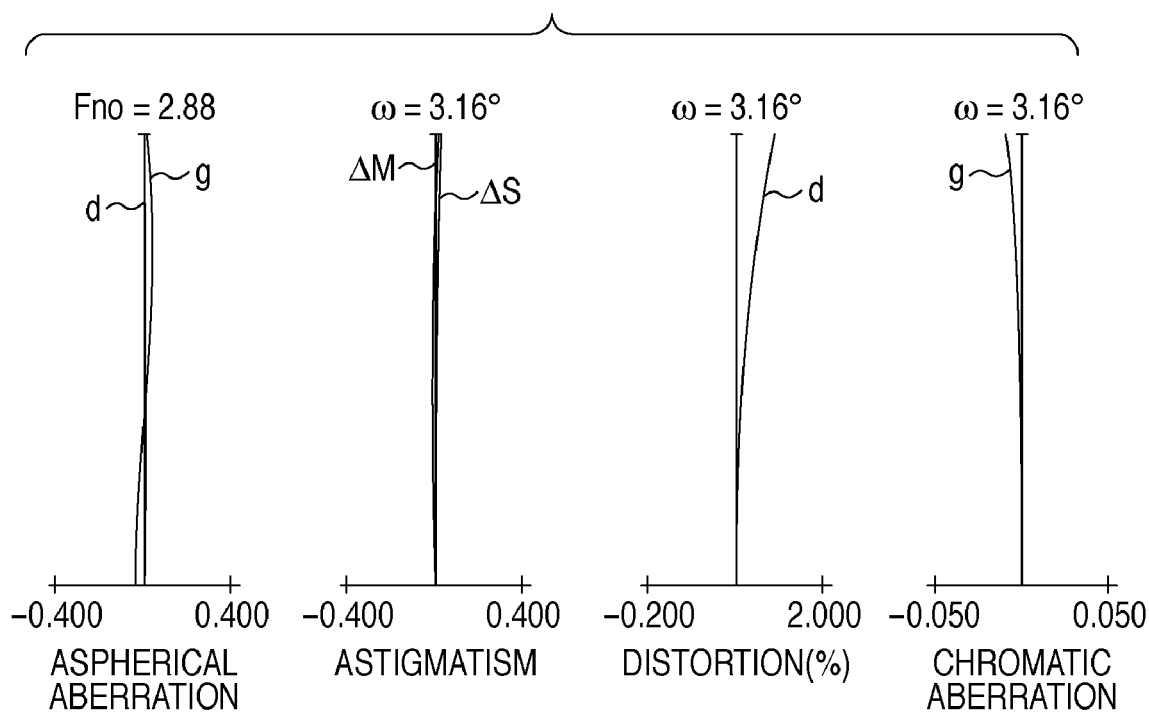
FIG. 8 is an aberration chart of the second numerical embodiment.

FIG. 7 is a sectional view of the lenses of an optical system of the second embodiment. FIG. 8 is an aberration chart in a case in which the optical system of the second embodiment is in focus on an infinite-distance object.

Figure 9:
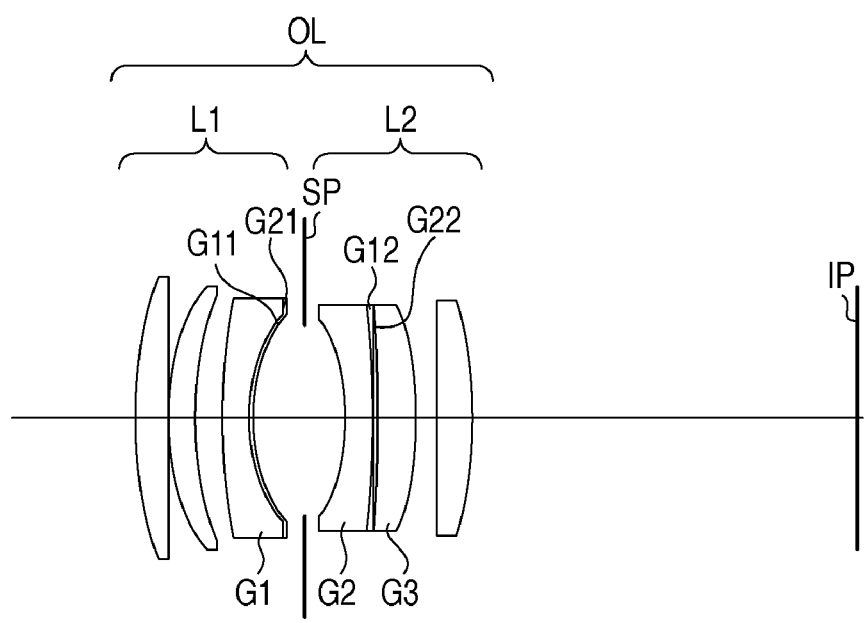
FIG. 9 is a sectional view of an optical system of the third numerical embodiment.
Figure 10:
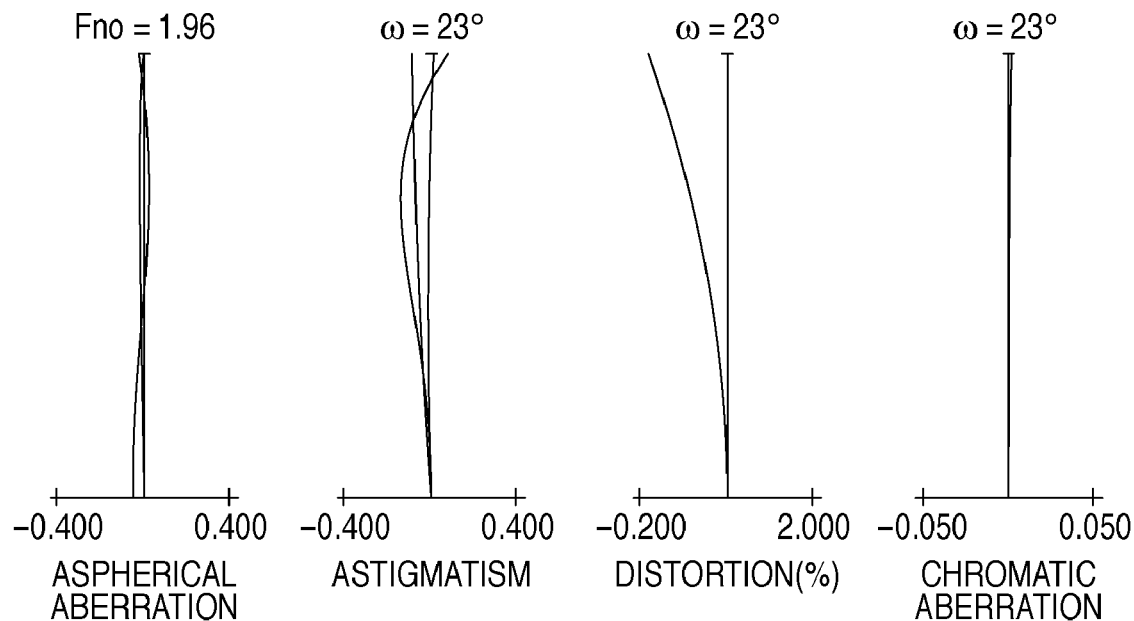
FIG. 10 is an aberration chart of the third numerical embodiment.

FIG. 9 is a sectional view of the lenses of an optical system of the third embodiment. FIG. 10 is an aberration chart in a case in which the optical system of the third embodiment is in focus on an infinite-distance object.

Figure 11:
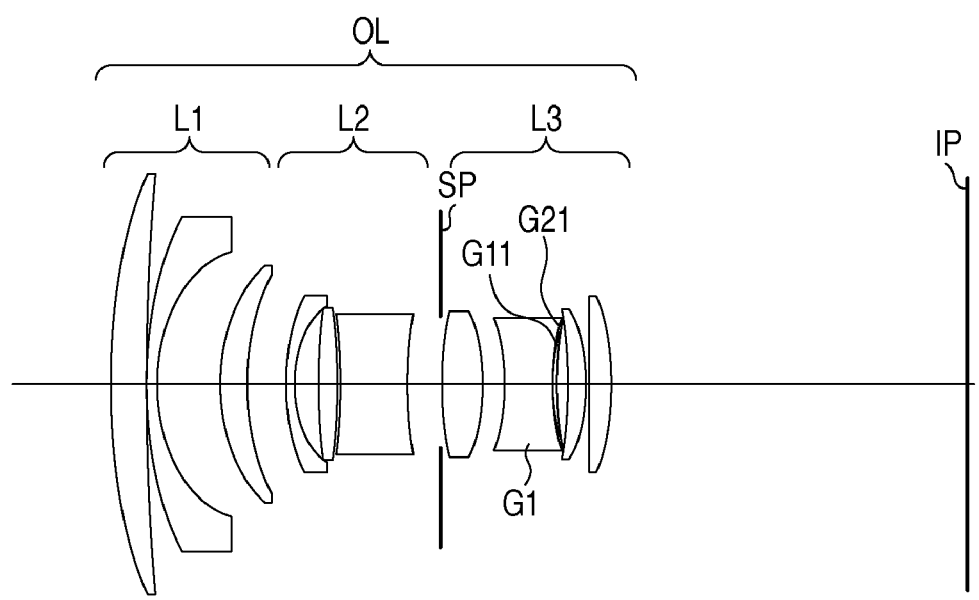
FIG. 11 is a sectional view of an optical system of the fourth numerical embodiment.
Figure 12:
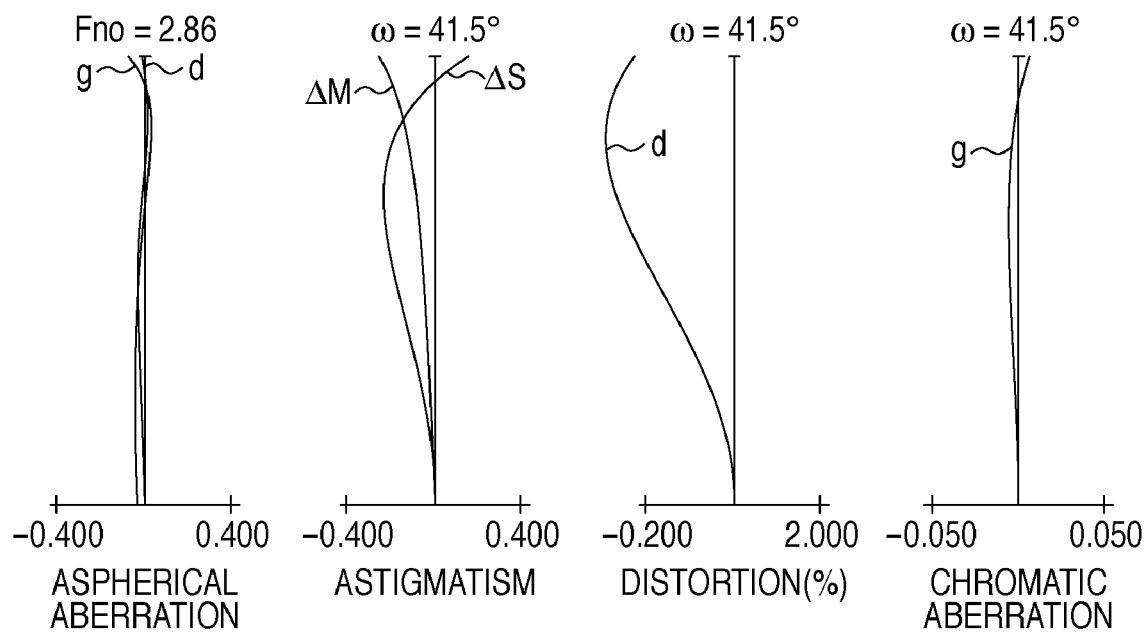
FIG. 12 is an aberration chart of the fourth numerical embodiment.

FIG. 11 is a sectional view of the lenses of an optical system of the fourth embodiment. FIG. 12 is an aberration chart in a case in which the optical system of the fourth embodiment is in focus on an infinite-distance object.

Figure 13:
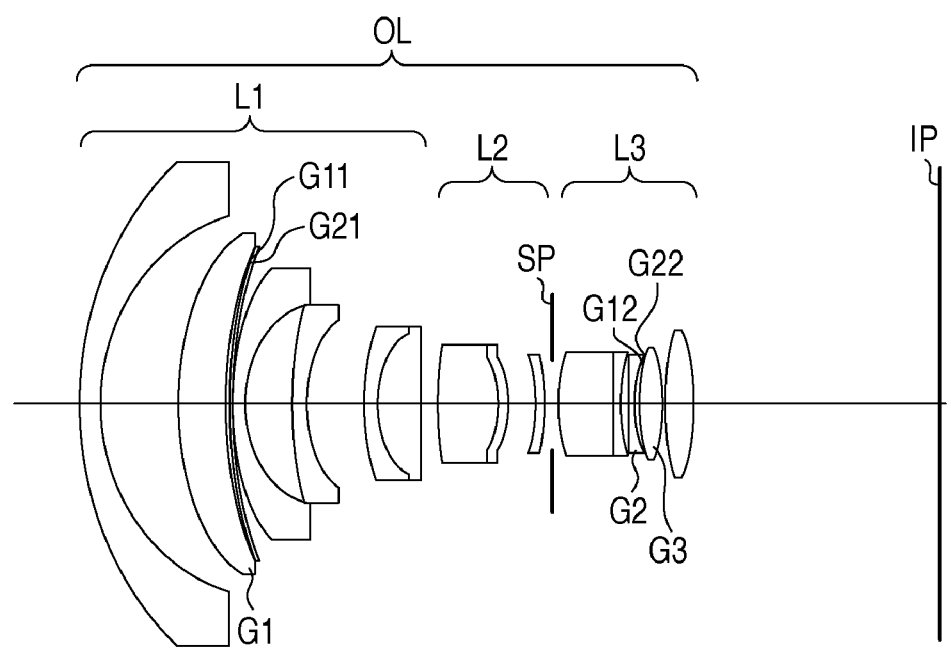
FIG. 13 is a sectional view of an optical system of the fifth numerical embodiment.
Figure 14:
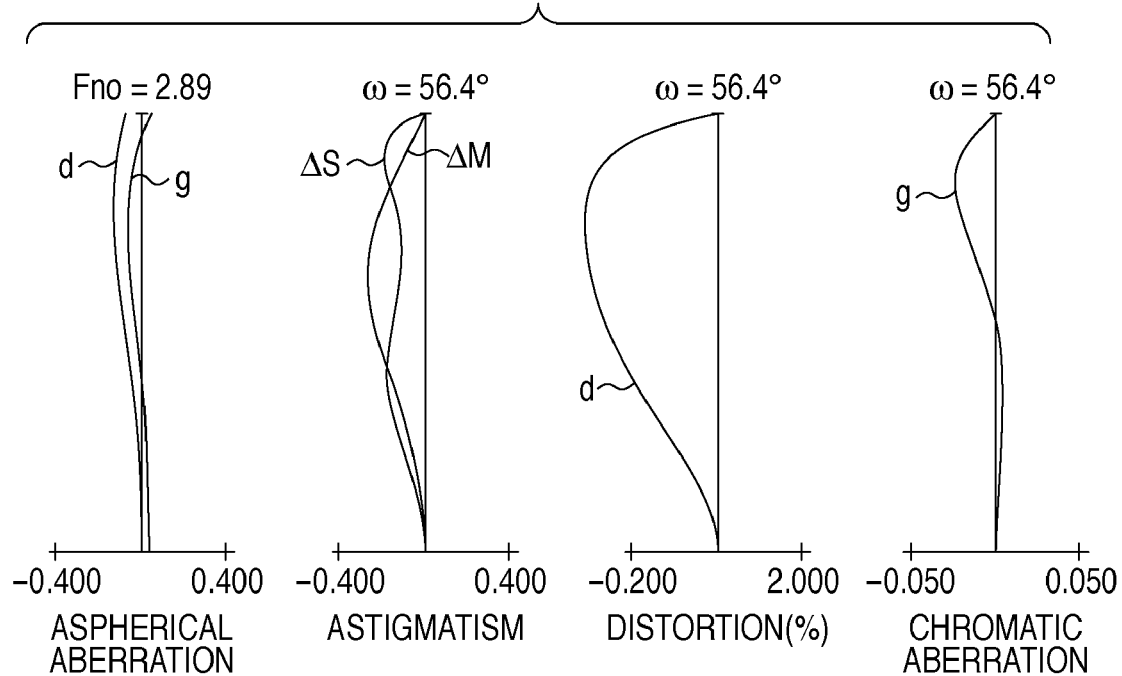
FIG. 14 is an aberration chart of the fifth numerical embodiment.

FIG. 13 is a sectional view of the lenses of an optical system of the fifth embodiment. FIG. 14 is an aberration chart in a case in which the optical system of the fifth embodiment is in focus on an infinite-distance object.

Figure 15:
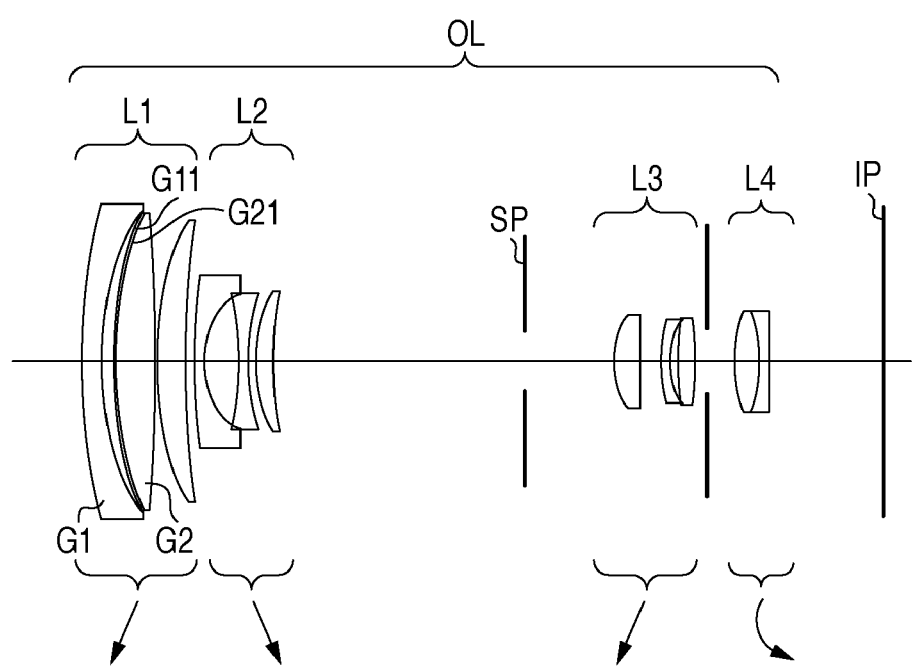
FIG. 15 is a sectional view of an optical system at the wide angle end in the sixth numerical embodiment.

FIG. 15 is a sectional view of the lenses of an optical system of the sixth embodiment. The optical system of the sixth embodiment is a zoom optical system. FIG. 15 is a sectional view of the lenses at the wide angle end (short focal length).

Figure 16A:
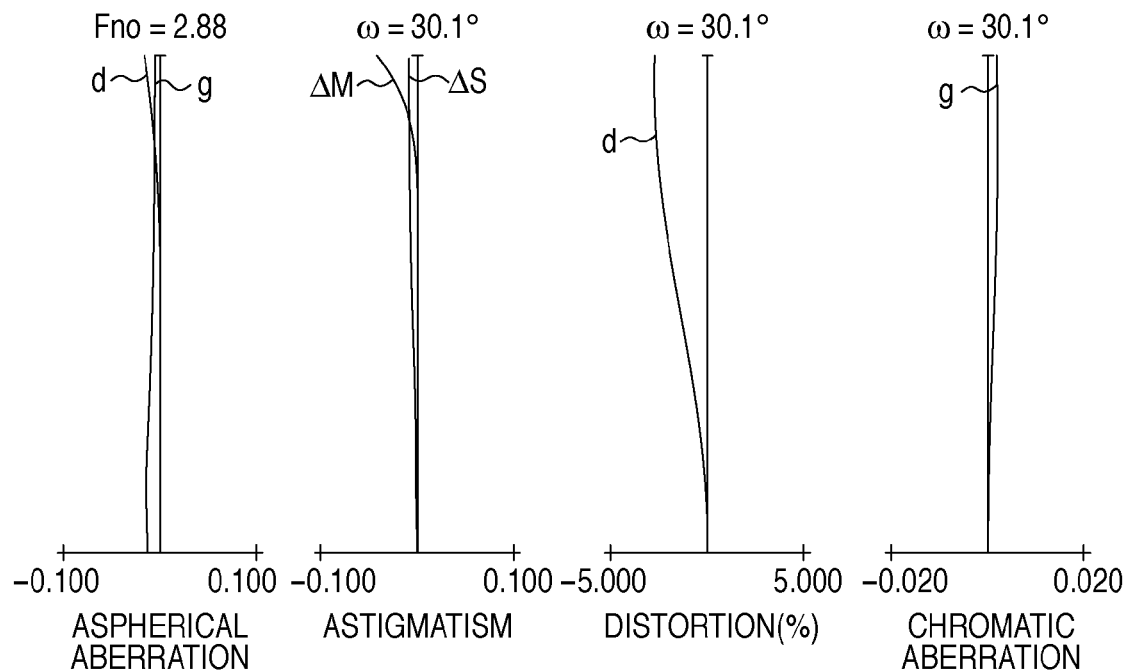
FIG. 16A is an aberration chart at the wide angle end in the sixth numerical embodiment.
Figure 16B:
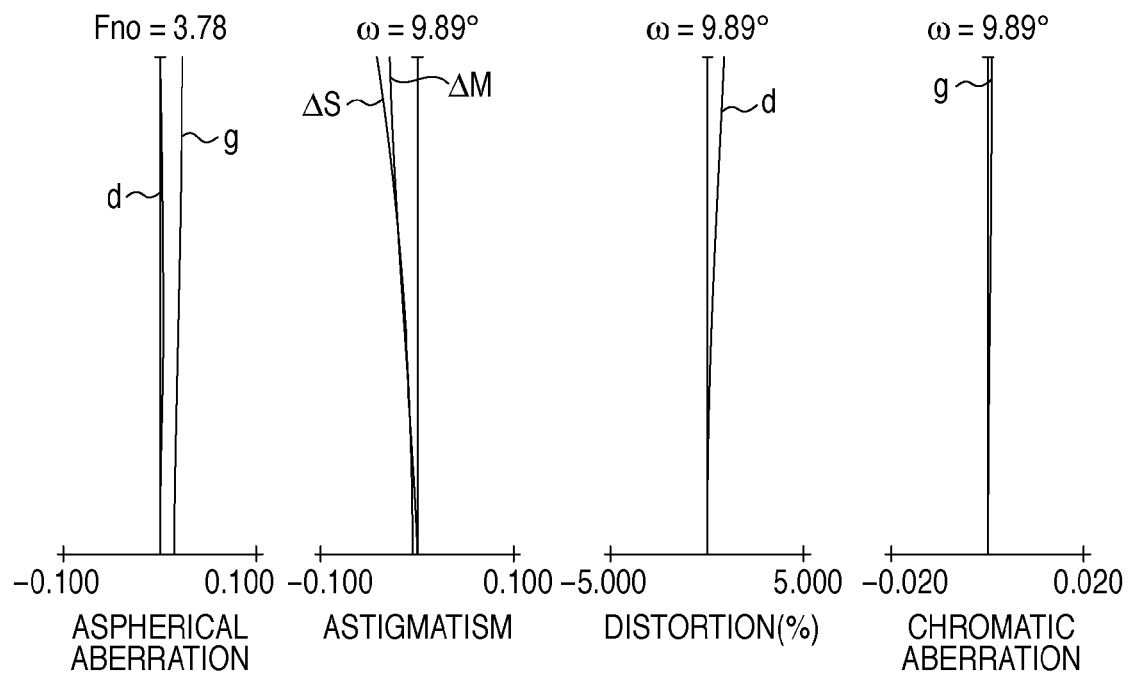
FIG. 16B is an aberration chart at the intermediate position in the sixth numerical embodiment.
Figure 16C:
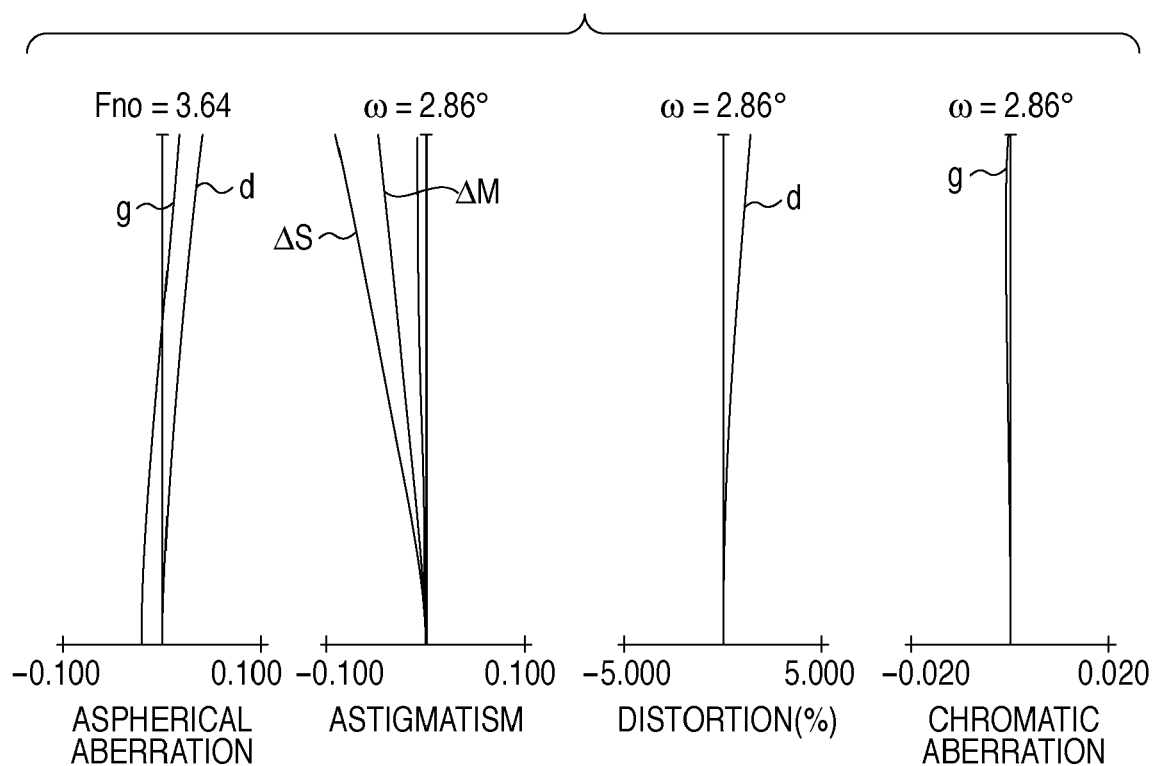
FIG. 16C is an aberration chart at the telephoto end in the sixth numerical embodiment.

FIGS. 16A, 16B, and 16C are aberration charts respectively showing cases in which the zoom optical system of the sixth embodiment is in focus on an infinite-distance object at the wide angle end, intermediate zoom position, and telephoto end (long focal length).

Figure 17:
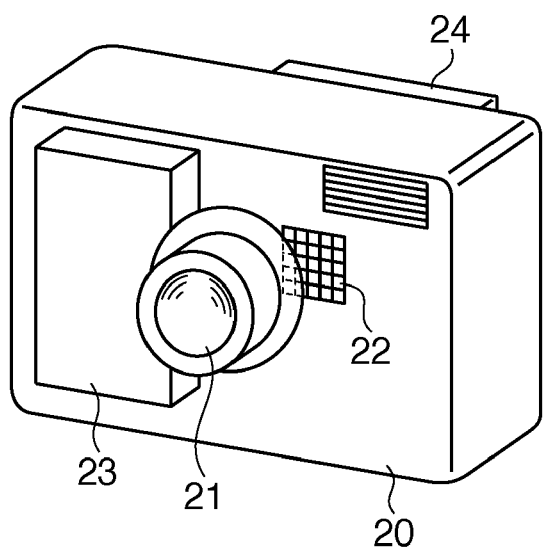
FIG. 17 is a schematic perspective view of an imaging apparatus of the present invention.

FIG. 17 is a schematic view of the main part of a camera (imaging apparatus) including the optical system of the present invention.

The optical system of each embodiment is a photographing lens system used for an imaging apparatus such as a video camera, digital camera, or silver halide film camera. In each sectional view of the lenses, the left side is the object side (front side), and the right side is the image side (rear side).

Note that when the optical system of each embodiment is to be used as the projection lens of a projector or the like, the left side is the screen, and the right side is a projected image.

In each sectional view of the lenses, reference symbol OL denotes an optical system; i, the ordinal rank of a lens group from the object side; and Li, the ith lens group.

Reference symbol SP denotes an aperture stop; and IP, an image plane. When the optical system is to be used as the photographing lens of a video camera or digital still camera, a photosensitive surface corresponding to a film surface in a silver halide film camera is placed at the imaging surface of a solid-state image sensor (photoelectric conversion device) such as a CCD sensor or CMOS sensor. Reference symbol G1j (j=1 to 3) denotes a first optical element; and G2j, a second optical element.

The optical system of each embodiment includes one or more of the cemented lenses described above.

Reference symbols G1 to G3 denote optical elements (lenses) forming part of the cemented lens. In each aberration chart, reference symbols d and g denote a d line and a g line, respectively; and ΔM and ΔS, a meridional image plane and a saggital image plane, respectively. Chromatic aberration of magnification is represented by a g line. Reference symbol ω denotes a half field angle; and Fno, an F-number.

The optical system OL of the first embodiment in FIG. 5 comprises a first lens group L1 which has positive refracting power and remains stationary during focusing operation, a second lens group L2 which has negative refracting power and moves in the optical axis direction for focusing operation, and a third lens group L3 which has negative refracting power and remains stationary during focusing operation.

The optical system OL is a compact telephoto lens having a focal length of 294 mm and a telephoto ratio (the value obtained by dividing the total length of the optical system (the length from the first lens surface to the image plane) by the focal length) of 0.748.

In this embodiment, first optical elements G11 and G12 made of a UV curable resin 1 and second optical elements G21 and G22 made of a mixture obtained by dispersing ITO fine particles in a base synthetic resin 1 at a volume ratio of 14.2% are used for part of an optical element G1 of the first lens group L1.

In addition, a first optical element G13 made of a mixture obtained by dispersing ITO fine particles in the base synthetic resin 1 at a volume ratio of 5% and a second optical element G23 made of a mixture obtained by dispersing $TiO_2$ fine particles in the base synthetic region 1 at a volume ratio of 3% are used for an optical element G2.

The first optical elements G11 and G12 in FIG. 5 are lenses having positive refracting power (power) which are formed by using the UV curable resin 1. The second optical elements G21 and G22 are lenses having negative refracting power which are formed by using an ITO mixture.

All the first and second optical elements G11, G21, G12, and G22 are tightly cemented. The interface (R3) between the first optical element G11 and the second optical element G21 has an aspherical shape. In addition, the first optical element G13 having negative refracting power which is formed by using an ITO mixture. The second optical element G23 is a lens having positive refracting power which is formed by using a $TiO_2$ mixture. The first and second optical elements G13 and G23 are tightly cemented.

In the optical system of the first embodiment, chromatic aberration is properly corrected by introducing the cemented lens of the present invention into the first lens group L1 located before the aperture stop SP, in which the passage position of a paraxial on-axis ray from the optical axis is relatively high. In the telephoto type optical system of the first embodiment, a cemented lens satisfying conditional expression (12) is preferably introduced to a position closer to the object side than the aperture stop SP. This facilitates properly correcting chromatic aberration.

In addition, the cemented lenses of the present invention are introduced at a plurality of positions to suppress the power of the first and second optical elements.

An optical system OL of the second embodiment in FIG. 7 comprises a first lens group which has positive refracting power and remains stationary during focusing operation, a second lens group L2 which has negative refracting power and moves in the optical axis direction for focusing operation, and a third lens group L3 which has negative refracting power and remains stationary during focusing operation. This optical system is a compact telephoto lens having a focal length of 392 mm and a telephoto ratio of 0.764.

In the second embodiment, a first optical element G11 made of a UV curable resin 1 and a second optical element G21 made of a mixture obtained by dispersing ITO fine particles in a base synthetic resin 1 at a volume ratio of 14.2% are used between optical elements G1 and G2 of the first lens group L1.

The first optical element G11 in FIG. 7 is a lens having positive refracting power (power) which is formed by using the UV curable resin 1, and the second optical element G21 is a lens having negative refracting power which is formed by using an ITO mixture. The first and second optical elements G11 and G21 are tightly cemented, and the interface (R3) between them has an aspherical shape.

In addition, since the first and second optical elements G11 and G21 are sandwiched between glasses G1 and G2, the surface areas of the optical elements which are in contact with the outside are small. With this arrangement, performance variation with changes in, for example, the temperature or humidity of an outside atmosphere becomes relatively small, and hence an optical system having high environmental resistance can be implemented.

In the optical system OL of the second embodiment, chromatic aberration is properly corrected by introducing the cemented lens according to the present invention into the first lens group L1 located before the aperture stop SP, in which the passage position of a paraxial on-axis ray from the optical axis is relatively high.

In the telephoto type optical system of the second embodiment, the cemented lens according to the present invention which satisfies conditional expression (12) is preferably introduced to a position closer to the object side than the aperture stop SP. This facilitates properly correcting chromatic aberration. In addition, using the aspherical shape can also properly correct chromatic spherical aberration.

An optical system OL of the third embodiment in FIG. 9 is a Gauss type photographing lens which comprises a first lens group L1 having positive refracting power and a second lens group L2 having positive refracting power, and has a focal length of 51 mm.

In the third embodiment, a first optical element G11 made of N-polyvinylcarbazole and a second optical element G21 made of a mixture obtained by dispersing ITO in N-polyvinylcarbazole at a volume ratio of 15% are arranged in an optical element G1 of the first lens group L1 located closer to the object side than an aperture stop SP.

In addition, a first optical element G12 made of a mixture obtained by dispersing ITO in N-polyvinylcarbazole at a volume ratio of 10% and a second optical element G22 made of a UV curable resin 2 are arranged between optical elements G2 and G3 of the second lens group L2 located closer to the image side than the aperture stop SP.

The first optical element G11 in FIG. 9 is a lens having positive refracting power which is formed by using N-polyvinylcarbazole, and the second optical element G21 is a lens having negative refracting power which is formed by an ITO mixture. The first and second optical elements G11 and G21 are tightly cemented.

The first optical element G12 is a lens having negative refracting power which is formed by an ITO mixture. The second optical element G22 is a lens having positive refracting power which is formed by using a UV curable resin. The first and second optical elements G21 and G22 are tightly cemented and sandwiched between the optical element (glass) G2 and the optical element (glass) G3.

In this case, the first optical element G12 is in tight contact with the convex surface side of the optical element G2 which is a negative meniscus lens located behind the aperture stop SP. With this arrangement, the curvature of the interface between the first optical element G12 and the second optical element G22 becomes relatively moderate. This decreases the sensitivity of the elements to curvature, and hence allows easy molding.

In the optical system OL of the third embodiment, the cemented lenses of the present invention are introduced to both the front side and rear side of the aperture stop SP at positions near the aperture stop SP at which the passage positions of pupil paraxial rays from the optical axis are relatively low. In a Gauss type optical system like that of the third embodiment or a nearly symmetrical type optical system, the cemented lenses of the present invention which satisfy conditional expression (12) are preferably arranged closer to both the object side and the image side, respectively, than the aperture stop SP. This can properly correct chromatic aberration. In the third embodiment, this makes it possible to simultaneously and properly correct axial chromatic aberration and chromatic aberration of magnification.

An optical system OL of the fourth embodiment in FIG. 11 comprises a first lens group L1 having negative refracting power, a second lens group L2 which has negative refracting power and moves in the optical axis direction for focusing operation, and a third lens group L3 which has positive refracting power and moves in the optical axis direction for focusing operation. This optical system uses a wide angle lens (retrofocus type optical system) which has a focal length of 24 mm and uses a floating mechanism.

In the fourth embodiment, a first optical element G11 made of a mixture obtained by dispersing ITO in a base synthetic resin 1 at a volume ratio of 20% and a second optical element G21 made of a mixture obtained by dispersing $TiO_2$ in the base synthetic resin 1 at a volume ratio of 20% are used for an optical element G1 of the third lens group L3.

The first optical element G11 in FIG. 11 is a lens having negative refracting power which is formed by using an ITO mixture. The second optical element G21 is a lens having positive refracting power which is formed by using a $TiO_2$ mixture. The first and second optical elements G11 and G21 are tightly cemented.

In the optical system OL of the fourth embodiment, the cemented lens of the present invention is placed in the third lens group L3 located closer to the image side than an aperture stop SP. In the retrofocus type optical system of the fourth embodiment, the cemented lens of the present invention is introduced to a position closer to the image side than the aperture stop SP to facilitate properly correcting chromatic aberration. This makes it possible to properly correct chromatic aberration in the fourth embodiment.

Note that a cemented lens of the present invention may be provided at a position closer to at least one of the object-side first lens group L1 and the second lens group L2 than the aperture stop SP.

An optical system OL of the fifth embodiment in FIG. 13 comprises a first lens group L1 having negative refracting power, a second lens group L2 which has negative refracting power and moves in the optical axis direction for focusing operation, and a third lens group L3 which has positive refracting power and moves in the optical axis direction for focusing operation. The optical system OL uses a wide angle lens which has a focal length of 14 mm and uses a floating mechanism.

In the fifth embodiment, a first optical element G11 made of a mixture obtained by dispersing ITO in N-polyvinylcarbazole at a volume ratio of 10% and a second optical element G21 made of N-polyvinylcarbazole are used for an optical element G1 of the first lens group L1 located closer to the object side than an aperture stop SP. In addition, a first optical element G12 made of a UV curable resin 1 and a second optical element G22 made of a mixture obtained by dispersing ITO in a base synthetic resin 1 at a volume ratio of 5% are used between optical elements G2 and G3 of the third lens group L3 located closer to the image side than the aperture stop SP.

The first optical element G11 in FIG. 13 is a lens having positive refracting power which is formed by using an ITO mixture. The second optical element G21 is a lens having negative refracting power which is formed by using N-polyvinylcarbazole. The first and second optical elements G11 and G21 are tightly cemented.

The first optical element G12 is a lens having positive refracting power which is formed by using a UV curable resin. The second optical element G22 is a lens having negative refracting power which is formed by using an ITO mixture. The first and second optical elements G12 and G22 are tightly cemented.

In the optical system OL of the fifth embodiment, the cemented lenses according to the present invention are arranged at a plurality of positions. This facilitates properly correcting chromatic aberration.

An optical system OL of the sixth embodiment in FIG. 15 is a four-group zoom lens with a zoom ratio of about 12 which comprises, sequentially from the object side to the image side, a first lens group L1 having positive refracting power, a second lens group L2 having negative refracting power, a third lens group L3 having positive refracting power, and a fourth lens group L4 having positive refracting power.

The arrows in FIG. 15 indicate the loci of movement of the respective lens groups at the time of zooming from the wide angle end to the telephoto end. When zooming is performed, the respective lens groups move such that the intervals between the lens groups change.

In the sixth embodiment, a first optical element G11 made of a UV curable resin and a second optical element G21 made of an ITO particle mixture are used between optical elements G1 and G2 of the first lens group L1. The first optical element G11 in FIG. 15 is a lens having positive refracting power which is formed by using a UV curable resin 1. The second optical element G21 is a lens having negative refracting power which is formed by a mixture obtained by dispersing ITO fine particles in a base synthetic resin 1 at a volume ratio of 14.2%. The first and second optical elements G11 and G21 are tightly cemented and sandwiched between the optical element (glass) G1 and the optical element (glass) G2.

In the sixth embodiment, the cemented lens according to the present invention which satisfies conditional expression (12) is preferably introduced in the first lens group L1, of the respective lens groups forming the zoom lens, in which the passage position of a paraxial on-axis ray from the optical axis is relatively high. According to this arrangement, it is possible to properly correct axial chromatic aberration and chromatic aberration of magnification in the zoom range from the wide angle end to the telephoto end and facilitate decreasing the total size of the optical system.

An optical system having the cemented lens of the present invention is not limited to the above optical systems and can be applied to any types of optical systems.

The following are concrete numerical data about the first to sixth numerical embodiments corresponding to the first to sixth embodiments. In each numerical embodiment, reference symbol i denotes a surface number counted from the object side; Ri, the curvature of radius of the ith optical surface (ith surface); and Di, the on-axis interval between the ith surface and the (i+1)th surface.

Reference symbols Ni and vi respectively denote the refractive index and Abbe number of the material for the ith optical member with respect to a d line.

Letting X be a displacement amount from a surface vertex in the optical axis direction, h be a height from the optical axis in a direction perpendicular to the optical axis, r be a paraxial curvature of radius, k be a conic constant, and B, C, D, E, . . . be aspherical coefficients of the respective orders, an aspherical shape is expressed by $$x(h) = \frac{(1/r)h^2}{1+\sqrt{\{1-(1+k)(h/r^2)\}}} + Bh^4 + Ch^6 + Dh^8 + Eh^{10} + \ldots$$

Note that "E±XX" in FIGS. 21A and 21B and each of the aspherical coefficients indicates "x10±XX".

FIGS. 20A to 20C show numerical values such as the refractive indexes, Abbe numbers, partial dispersion ratios, and powers of first and second optical elements G1j and G2j used in each numerical embodiment with respect to a d line, g line, C line, and F line.

FIGS. 21A and 21B show numerical values corresponding to conditional expressions (3), (4), (7), (8), (11), and (12).

| <First Numerical Embodiment> | | | | |
|---|---|---|---|---|
| Surface Number | r | d | nd | νd |
| 1 | 160.972 | 8.58 | 1.4887 | 70.2 |
| 2 | −222.609 | 0.60 | 1.6356 | 22.7 |
| 3* | −187.606 | 0.10 | 1.5648 | 20.0 |
| 4 | −207.717 | 0.60 | 1.6356 | 22.7 |
| 5 | −178.648 | 0.10 | 1.5648 | 20.0 |
| 6 | −189.590 | 0.15 | | |
| 7 | 112.991 | 6.40 | 1.4870 | 70.4 |
| 8 | 818.071 | 0.10 | 1.5425 | 29.0 |
| 9 | 560.358 | 0.40 | 1.5532 | 39.8 |
| 10 | 812.156 | 7.61 | | |
| 11 | −220.209 | 3.40 | 1.7534 | 27.5 |
| 12 | 422.242 | 0.15 | | |
| 13 | 55.406 | 7.65 | 1.4870 | 70.4 |
| 14 | 158.441 | 11.28 | | |
| 15 | 50.781 | 3.00 | 1.6660 | 47.0 |
| 16 | 36.905 | 10.79 | | |
| 17(stop) | ∞ | 0.00 | | |
| 18 | ∞ | 4.00 | | |
| 19 | 193.990 | 3.72 | 1.7473 | 26.3 |
| 20 | −119.286 | 2.00 | 1.8850 | 41.0 |
| 21 | 81.708 | 30.56 | | |
| 22 | 82.180 | 1.60 | 1.8500 | 23.0 |
| 23 | 32.099 | 6.12 | 1.7304 | 52.4 |
| 24 | −108.969 | 0.15 | | |
| 25 | ∞ | 0.00 | | |
| 26 | 69.749 | 3.65 | 1.8720 | 33.5 |
| 27 | −114.699 | 1.50 | 1.7735 | 50.3 |
| 28 | 28.660 | 9.92 | | |
| 29 | −39.991 | 1.50 | 1.7043 | 53.8 |
| 30 | 792.944 | 0.82 | | |
| 31 | 67.681 | 7.81 | 1.6192 | 34.7 |
| 32 | −27.416 | 1.80 | 1.8207 | 45.8 |
| 33 | −61.207 | 83.95 | | |

| | |
|---|---|
| Focal Length | 293.99 |
| F-number | 4.14 |
| Field Angle | 4.21 |
| Image Height | 21.64 |
| Total Lens Length | 220.00 |
| BF | 83.95 |

| Aspherical Surface Data (Third Surface) | |
|---|---|
| k | −4.2536E−01 |
| B | 7.8768E−09 |
| C | 2.2046E−12 |
| D | 2.8013E−15 |
| E | −5.8089E−19 |

| <Second Numerical Embodiment> | | | | |
|---|---|---|---|---|

| | |
|---|---|
| Focal Length | 392.00 |
| F-number | 2.88 |
| Field Angle | 3.16 |
| Image Height | 21.64 |
| Total Lens Length | 299.32 |
| BF | 64.82 |

| Surface Number | r | d | nd | νd |
|---|---|---|---|---|
| 1 | 117.835 | 9.16 | 1.4875 | 70.2 |
| 2 | 171.288 | 2.00 | 1.6356 | 22.7 |
| 3* | 198.370 | 0.05 | 1.5648 | 20.0 |
| 4 | 174.689 | 20.00 | 1.4875 | 70.2 |
| 5 | −629.325 | 9.39 | | |
| 6 | 99.381 | 15.59 | 1.4875 | 70.2 |
| 7 | 441.881 | 5.48 | | |
| 8 | −727.900 | 4.00 | 1.8340 | 37.2 |
| 9 | 184.723 | 20.80 | | |
| 10 | 87.849 | 9.00 | 1.4875 | 70.2 |
| 11 | 251.334 | 0.15 | | |
| 12 | 54.908 | 4.00 | 1.8052 | 25.4 |
| 13 | 43.350 | 37.71 | | |
| 14 | 244.772 | 2.80 | 1.6583 | 57.3 |
| 15 | 63.310 | 25.00 | | |
| 16 | ∞ | 2.27 | | |
| 17 | −141.572 | 4.00 | 1.8467 | 23.8 |
| 18 | −117.763 | 0.15 | | |
| 19(stop) | 65.966 | 5.52 | 1.5400 | 59.5 |
| 20 | −105.637 | 3.00 | 1.8340 | 37.2 |
| 21 | 76.891 | 28.89 | | |
| 22 | 183.461 | 8.46 | 1.6700 | 39.3 |
| 23 | −44.575 | 2.50 | 1.5400 | 59.5 |
| 24 | 62.415 | 8.57 | | |
| 25 | 71.860 | 6.00 | 1.5927 | 35.3 |
| 26 | 710.477 | 64.82 | | |

| Aspherical Surface Data (Third Surface) | |
|---|---|
| k | 1.8877E−01 |
| B | 6.4274E−09 |
| C | −1.1579E−12 |
| D | 4.9144E−17 |
| E | 1.1708E−20 |

| <Third Numerical Embodiment> | |
|---|---|
| Focal Length | 51.00 |
| F-number | 1.96 |
| Field Angle | 22.95 |
| Image Height | 21.60 |
| Total Lens Length | 71.96 |
| BF | 37.50 |

| Surface Number | r | d | nd | νd |
|---|---|---|---|---|
| 1 | 39.017 | 2.99 | 1.7944 | 48.4 |
| 2 | 176.987 | 0.15 | | |
| 3 | 24.200 | 2.85 | 1.8730 | 32.5 |
| 4 | 32.413 | 2.31 | | |
| 5 | 48.762 | 2.93 | 1.7574 | 25.9 |
| 6 | 17.976 | 0.23 | 1.6959 | 17.7 |
| 7 | 18.616 | 0.10 | 1.7211 | 12.6 |
| 8* | 17.092 | 4.89 | | |
| 9(stop) | ∞ | 6.03 | | |
| 10 | −17.925 | 2.50 | 1.6228 | 34.3 |
| 11 | −89.962 | 0.10 | 1.7127 | 13.8 |
| 12* | −492.068 | 0.25 | 1.6296 | 25.3 |
| 13 | −168.744 | 4.00 | 1.8724 | 41.8 |
| 14 | −28.988 | 1.92 | | |
| 15 | 1580.028 | 3.21 | 1.8046 | 47.3 |
| 16 | −38.406 | | | |

| Aspherical Surface Data | | |
|---|---|---|
| | Eighth Surface | 12th Surface |
| k | 3.9753E−02 | −5.0275E+02 |
| B | 1.7974E−06 | 2.2109E−06 |
| C | 2.5985E−09 | 1.0109E−08 |
| D | −1.4979E−10 | −1.8172E−10 |
| E | 1.8400E−12 | −1.3764E−12 |

Fourth Numerical Embodiment

| | |
|---|---|
| Focal Length | 24.48 |
| F-number | 2.86 |
| Field Angle | 41.47 |
| Image Height | 21.64 |
| Total Lens Length | 92.00 |
| BF | 38.00 |

| Surface Number | r | d | nd | vd |
|---|---|---|---|---|
| 1 | 72.998 | 3.78 | 1.5959 | 61.6 |
| 2 | 300.555 | 0.15 | | |
| 3 | 44.538 | 1.00 | 1.8850 | 41.0 |
| 4 | 16.752 | 6.89 | | |
| 5 | 18.821 | 2.85 | 1.8500 | 23.0 |
| 6 | 28.023 | 4.09 | | |
| 7 | 22.808 | 0.90 | 1.8628 | 27.5 |
| 8 | 11.104 | 2.76 | | |
| 9 | 65.695 | 1.98 | 1.8551 | 24.6 |
| 10 | −74.883 | 0.25 | | |
| 11 | −102.304 | 7.35 | 1.5283 | 66.3 |
| 12 | 52.340 | 3.42 | | |
| 13(stop) | ∞ | 0.15 | | |
| 14 | 37.044 | 4.55 | 1.8313 | 38.1 |
| 15 | −20.625 | 2.34 | | |
| 16 | −21.355 | 5.02 | 1.8500 | 23.0 |
| 17 | 30.815 | 0.10 | 1.5963 | 13.9 |
| 18 | 27.846 | 0.30 | 1.7088 | 21.6 |
| 19 | 39.990 | 1.18 | | |
| 20 | −56.730 | 2.18 | 1.4870 | 70.4 |
| 21 | −17.915 | 0.15 | | |
| 22 | 10923.846 | 2.60 | 1.7375 | 52.0 |
| 23 | −26.864 | 38.00 | | |

Fifth Numerical Embodiment

| | |
|---|---|
| Focal Length | 14.35 |
| F-number | 2.89 |
| Field Angle | 56.40 |
| Image Height | 21.60 |
| Total Lens Length | 135.01 |
| BF | 38.48 |

Surface Data

| Surface Number | r | d | nd | vd |
|---|---|---|---|---|
| 1 | 54.598 | 3.00 | 1.7800 | 50.0 |
| 2 | 31.238 | 12.29 | | |
| 3* | 63.674 | 7.47 | 1.6406 | 58.4 |
| 4 | 68.032 | 0.80 | 1.7127 | 13.8 |
| 5 | 79.476 | 0.05 | 1.6959 | 17.7 |
| 6 | 68.330 | 0.15 | | |
| 7 | 39.761 | 1.80 | 1.7800 | 50.0 |
| 8 | 16.943 | 7.75 | | |
| 9 | 70.105 | 1.80 | 1.7800 | 50.0 |
| 10 | 18.934 | 9.57 | | |
| 11 | 43.123 | 2.00 | 1.8294 | 45.0 |
| 12 | 15.497 | 7.00 | 1.7549 | 26.0 |
| 13 | −225.113 | 2.65 | | |
| 14 | 105.224 | 9.81 | 1.4892 | 70.2 |
| 15 | −13.547 | 1.20 | 1.8500 | 23.0 |
| 16 | −17.952 | 4.55 | | |
| 17 | −21.783 | 1.20 | 1.8850 | 41.0 |
| 18 | −44.163 | 1.00 | | |
| 19(stop) | ∞ | 1.00 | | |
| 20 | 25.752 | 8.64 | 1.6062 | 40.5 |
| 21 | 423.392 | 1.26 | 1.9230 | 20.8 |
| 22 | 34.571 | 0.98 | | |
| 23 | −354.070 | 1.20 | 1.8821 | 38.6 |
| 24 | 20.618 | 0.64 | 1.6355 | 22.7 |
| 25 | 33.760 | 0.05 | 1.5425 | 29.0 |
| 26 | 27.565 | 3.81 | 1.4870 | 70.4 |
| 27 | −23.397 | 0.20 | | |
| 28 | 53.779 | 4.67 | 1.6532 | 57.4 |
| 29 | −33.909 | 38.48 | | |
| 30 | | | | |
| 31 | | | | |

Aspherical Surface Data (Third Surface)

| | |
|---|---|
| k | 0.0000E+00 |
| B | 7.9984E−06 |
| C | 1.1075E−09 |
| D | −4.1259E−12 |
| E | 8.5543E−15 |

Sixth Numerical Embodiment

| | Wide Angle End | Intermediate Position | Telephoto End |
|---|---|---|---|
| Focal Length | 6.15 | 20.45 | 71.28 |
| F-number | 2.88 | 3.78 | 3.64 |
| Field Angle | 30.09 | 9.89 | 2.86 |
| Image Height | 3.56 | 3.56 | 3.56 |
| Total Lens Length | 81.98 | 85.58 | 86.56 |
| BF | 11.56 | 14.75 | 9.34 |
| d7 | 0.80 | 18.23 | 31.76 |
| d13 | 25.61 | 13.43 | 1.29 |
| d14 | 9.13 | 1.20 | 2.48 |
| d20 | 1.10 | 2.19 | 4.98 |
| d21 | 3.00 | 4.99 | 5.92 |
| d24 | 11.56 | 14.75 | 9.34 |

| Surface Number | r | d | nd | vd |
|---|---|---|---|---|
| 1 | 71.850 | 2.00 | 1.8500 | 23.0 |
| 2 | 31.416 | 0.99 | 1.6356 | 22.7 |
| 3 | 40.451 | 0.05 | 1.5648 | 20.0 |
| 4 | 37.918 | 4.41 | 1.4932 | 69.7 |
| 5 | −323.443 | 0.15 | | |
| 6 | 33.430 | 3.10 | 1.7498 | 51.4 |
| 7 | 151.878 | (variable) | | |
| 8 | 57.767 | 0.90 | 1.8582 | 42.8 |
| 9 | 8.856 | 3.82 | | |
| 10 | −30.420 | 0.75 | 1.6017 | 61.3 |
| 11 | 24.070 | 0.79 | | |
| 12 | 16.552 | 1.89 | 1.9152 | 20.6 |
| 13 | 50.082 | (variable) | | |
| 14(stop) | ∞ | (variable) | | |
| 15* | 7.672 | 2.81 | 1.5604 | 63.9 |
| 16 | 262.567 | 2.30 | | |
| 17 | 20.630 | 0.70 | 1.8167 | 31.9 |
| 18 | 7.094 | 0.98 | | |
| 19 | 36.555 | 1.70 | 1.6129 | 60.7 |
| 20 | −67.789 | (variable) | | |
| 21 | ∞ | (variable) | | |
| 22 | 16.043 | 2.65 | 1.7753 | 50.2 |
| 23 | −12.932 | 0.80 | 1.7103 | 29.1 |
| 24 | 116.489 | (variable) | | |

Aspherical Surface Data (15th Surface)

| | |
|---|---|
| k | −4.1923E−01 |
| B | −6.0718E−05 |
| C | 7.5575E−08 |
| D | −2.3825E−08 |
| E | 4.7278E−10 |

-continued

<Sixth Numerical Embodiment>

Various Data
Zoom Ratio 11.59

| Focal Length | 6.15 | 20.45 | 71.28 | 38.3 | 9.65 |
|---|---|---|---|---|---|
| F-number | 2.88 | 3.78 | 3.64 | 3.76 | 3.67 |
| Field Angle | 30.09 | 9.89 | 2.86 | 5.32 | 20.27 |
| Image Height | 3.56 | 3.56 | 3.56 | 3.56 | 3.56 |
| Total Lens Length | 81.98 | 85.58 | 86.56 | 86.56 | 79.56 |
| BF | 11.56 | 14.75 | 9.34 | 14.83 | 13.24 |

| | Wide Angle End | Intermediate Position | Telephoto End | | |
|---|---|---|---|---|---|
| d7 | 0.80 | 18.23 | 31.76 | 25.73 | 5.3 |
| d13 | 25.61 | 13.43 | 1.29 | 6.56 | 22.18 |
| d14 | 9.13 | 1.20 | 2.48 | 1.29 | 1.2 |
| d20 | 1.10 | 2.19 | 4.98 | 1.87 | 2.1 |
| d21 | 3.00 | 4.99 | 5.92 | 5.49 | 4.75 |
| d24 | 11.56 | 14.75 | 9.34 | 14.83 | 13.24 |

Zoom Lens Group Data

| Group | Start Surface | Focal Length |
|---|---|---|
| 1 | 7 | 49.14 |
| 2 | 13 | −11.38 |
| 3 | 14 | ∞ |
| 4 | 20 | 25.78 |
| 5 | 21 | ∞ |
| 6 | 24 | 21.06 |

An embodiment of a digital still camera (optical apparatus) using the optical system exemplified in each embodiment as an imaging optical system will be described next with reference to FIG. 17.

Referring to FIG. 17, reference numeral 20 denotes a camera body; 21, an imaging optical system formed by one of the optical systems described in the first to fifth embodiments; and 22, a solid-state image sensor (photoelectric conversion device) such as a CCD sensor or CMOS sensor which receives an object image formed by the imaging optical system 21 built in the camera body.

Reference numeral 23 denotes a memory which records information corresponding to the object image photoelectrically converted by the solid-state image sensor 22; and 24, a finder which is formed by a liquid crystal display panel or the like and is used to observe the object image formed on the solid-state image sensor 22.

Applying the optical system of the present invention to a digital still camera in this manner can implement a compact optical apparatus having high optical performance.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2008-009081, filed on Jan. 18, 2008, which is hereby incorporated by reference herein in its entirety.

What is claimed is:

1. A cemented lens comprising a first optical element, a second optical element, and a third optical element respectively formed by different solid materials, said third optical element and said first optical element being cemented to each other, and said first optical element and said second optical element being cemented to each other, wherein both an incident surface and an exit surface of said first optical element and said second optical element are refracting surfaces, and
the following conditional expressions are satisfied:

$|\Delta\theta gF1|>0.0272$ $|\Delta\theta gF2|>0.0272$ $\Delta\theta gF1 \times \Delta\theta gF2<0$ $\phi1 \times \phi2<0$ where $\Delta\theta gF1$ and $\Delta\theta gF2$ are respectively anomalous dispersion characteristics of the materials for said first optical element and said second optical element with respect to a g line and an F line, and $\phi1$ and $\phi2$ are respectively refracting powers of said first optical element and said second optical element when both the incident surface and the exit surface of said first optical element and said second optical element are surfaces in contact with air.

2. The lens according to claim 1, wherein the following conditional expressions are satisfied:

$vd1<60$ $vd2<60$ where vd1 and vd2 are respectively Abbe numbers of said first optical element and said second optical element with respect to a d line.

3. The lens according to claim 1, wherein said first optical element and said second optical element satisfy the following conditional expressions:

$\Delta\theta gF1 \times \phi1 > 0$ $\Delta\theta gF2 \times \phi2 > 0.$

4. The lens according to claim 1, wherein the following conditional expressions are satisfied:

$|\Delta\theta gd1|>0.038$ $|\Delta\theta gd2|>0.038$ $\Delta\theta gd1 \times \Delta\theta gd2 < 0$ $\Delta\theta gF1 \times \Delta\theta gd1 < 0$ where $\Delta\theta gd1$ and $\Delta\theta gd2$ are respectively anomalous dispersion characteristics of the materials for said first optical element and said second optical element with respect to a g line and a d line.

5. The lens according to claim 1, wherein said first optical element and said second optical element are formed on a convex surface of said third optical element, and are formed by shapes satisfying $\phi1<0$ $0<\phi2.$ 6. The lens according to claim 1, wherein said first optical element and said second optical element are formed on a concave surface of said third optical element, and are formed by shapes satisfying $0<\phi1$ $\phi2<0.$ 7. An optical system including a cemented lens, said cemented lens comprising a first optical element, a second optical element, and a third optical element respectively formed by different solid materials, said third optical element and said first optical element being cemented, and said first optical element and said second optical element being cemented, wherein both an incident surface and an exit surface of said first optical element and said second optical element are refracting surfaces, and the following conditional expressions are satisfied:

$$|\Delta\theta gF1| > 0.0272$$

$$|\Delta\theta gF2| > 0.0272$$

$$\Delta\theta gF1 \times \Delta\theta gF2 < 0$$

$$\phi 1 \times \phi 2 < 0$$

where $\Delta\theta F1$ and $\Delta\theta gF2$ are respectively anomalous dispersion characteristics of the materials for said first optical element and said second optical element with respect to a g line and an F line, and $\phi 1$ and $\phi 2$ are respectively refracting powers of said first optical element and said second optical element when both the incident surface and the exit surface of said first optical element and said second optical element are surfaces in contact with air.

8. The system according to claim 7, wherein the optical system comprises, sequentially from an object side to an image side, a first lens group which has positive refracting power and remains stationary during focusing operation, a second lens group which has negative refracting power and moves along an optical axis for focusing operation, and a third lens group which remains stationary during focusing operation, and said cemented lens is included in said first lens group.

9. The system according to claim 7, wherein the optical system comprises, sequentially from an object side to an image side, a first lens group having positive refracting power, an aperture stop, and a second lens group having positive refracting power, and said cemented lens is included in both said first lens group and said second lens group.

10. The system according to claim 7, wherein the optical system comprises, sequentially from an object side to an image side, a first lens group which has negative refracting power and remains stationary during focusing operation, a second lens group which has negative refracting power and moves along an optical axis for focusing operation, and a third lens group which has positive refracting power and moves along the optical axis for focusing operation, and said cemented lens is included in at least one of said first lens group and said third lens group.

11. The system according to claim 7, wherein the optical system is a zoom lens comprising, sequentially from an object side to an image side, a first lens group having positive refracting power, a second lens group having negative refracting power, a third lens group having positive refracting power, and a fourth lens group having positive refracting power, with intervals between said lens groups changing in zooming, and said cemented lens is included in said first lens group.

12. A method of manufacturing a cemented lens, the cemented lens including a first optical element, a second optical element, and a third optical element respectively formed by different solid materials, the third optical element and the first optical element being cemented, and the first optical element and the second optical element being cemented, wherein an incident surface and an exit surface of the first optical element and the second optical element being refracting surfaces, and the following conditional expressions being satisfied:

$$|\Delta\theta gF1| > 0.0272$$

$$|\Delta\theta gF2| > 0.0272$$

$$\Delta\theta gF1 \times \Delta\theta gF2 < 0$$

$$\phi 1 \times \phi 2 < 0$$

where $\Delta\theta gF1$ and $\Delta\theta gF2$ are respectively anomalous dispersion characteristics of the materials for the first optical element and the second optical element with respect to a g line and an F line, and $\phi 1$ and $\phi 2$ are respectively refracting powers of the first optical element and the second optical element when both the incident surface and the exit surface of the first optical element and the second optical element are surfaces in contact with air, the method comprising steps of:

forming the first optical element on the third optical element; and forming the second optical element on the first optical element.

* * * * *